US012337656B2

(12) United States Patent
Suzuki et al.

(10) Patent No.: US 12,337,656 B2
(45) Date of Patent: Jun. 24, 2025

(54) REFRIGERATION CYCLE DEVICE

(71) Applicant: DENSO CORPORATION, Kariya (JP)

(72) Inventors: Satoshi Suzuki, Kariya (JP); Satoshi Itoh, Kariya (JP); Takuya Mitsuhashi, Kariya (JP); Atsushi Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 18/070,060

(22) Filed: Nov. 28, 2022

(65) Prior Publication Data

US 2023/0091458 A1 Mar. 23, 2023

Related U.S. Application Data

(63) Continuation of application No. PCT/JP2021/018572, filed on May 17, 2021.

(30) Foreign Application Priority Data

Jun. 29, 2020 (JP) ................. 2020-111492

(51) Int. Cl.
*B60H 1/00* (2006.01)
*B60H 1/32* (2006.01)
*B60K 11/04* (2006.01)

(52) U.S. Cl.
CPC ....... *B60H 1/00899* (2013.01); *B60H 1/3204* (2013.01); *B60K 11/04* (2013.01)

(58) Field of Classification Search
CPC .............. B60H 1/00899; B60H 1/3204; B60H 1/00278; B60H 1/143; B60H 2001/00928; B60H 2001/00949; B60H 1/00921; B60K 11/04; B60K 11/02; B60K 11/085; B60K 11/08; F25B 1/00; F25B 27/02; Y02A 30/274; Y02T 10/70; Y02T 10/88
See application file for complete search history.

(56) References Cited

U.S. PATENT DOCUMENTS

| | | | |
|---|---|---|---|
| 2018/0312053 A1 | 11/2018 | Moro et al. | |
| 2020/0171919 A1* | 6/2020 | Ishizeki | B60H 1/00914 |
| 2020/0207182 A1 | 7/2020 | Ishizeki et al. | |

FOREIGN PATENT DOCUMENTS

| | | | |
|---|---|---|---|
| DE | 102016006134 A1 | 12/2016 | |
| DE | 112018004722 T5 | 6/2020 | |
| JP | 2006250493 A * | 9/2006 | |
| JP | 2014223866 A * | 12/2014 | B60H 1/00914 |

(Continued)

*Primary Examiner* — Kun Kai Ma
(74) *Attorney, Agent, or Firm* — Harness, Dickey & Pierce, P.L.C.

(57) ABSTRACT

A refrigeration cycle device includes: a compressor; a heat radiating unit that causes refrigerant to heat air supplied to a space inside a vehicle cabin; a decompression unit that decompresses the refrigerant; an outside air heat absorbing unit that causes the refrigerant to absorb heat from outside air; a waste heat absorbing unit that causes the refrigerant to absorb waste heat of a waste heat device; a shutter that opens and closes a passage for the outside air introduced into the outside air heat absorbing unit; and a control unit that closes the shutter when it is determined that an amount of waste heat of the waste heat device is larger than an amount of heat absorbed by the refrigerant in the outside air heat absorbing unit and the waste heat absorbing unit.

12 Claims, 13 Drawing Sheets

(56) References Cited

FOREIGN PATENT DOCUMENTS

| | | | | |
|---|---|---|---|---|
| JP | 2014225981 A | * | 12/2014 | ......... B60H 1/00914 |
| JP | 2015200194 A | * | 11/2015 | |
| JP | 2019051899 A | | 4/2019 | |

* cited by examiner

REFRIGERATION CYCLE DEVICE

CROSS REFERENCE TO RELATED APPLICATION

The present application is a continuation application of International Patent Application No. PCT/JP2021/018572 filed on May 17, 2021, which designated the U.S. and claims the benefit of priority from Japanese Patent Application No. 2020-111492 filed on Jun. 29, 2020. The entire disclosures of all of the above applications are incorporated herein by reference.

TECHNICAL FIELD

The present disclosure relates to a refrigeration cycle device for a vehicle.

BACKGROUND ART

A refrigeration cycle device for a vehicle includes a heat exchanger that functions as a condenser when the air in a vehicle cabin is cooled and functions as an evaporator when the air in the vehicle cabin is heated.

SUMMARY

According to an aspect of the present disclosure, a refrigeration cycle device includes a compressor, a heat radiating unit, a decompression unit, an outside air heat absorbing unit, a waste heat absorbing unit, a shutter and a control unit. The compressor sucks, compresses, and discharges a refrigerant. The heat radiating unit causes the refrigerant discharged from the compressor to radiate heat to heat air supplied to a space inside a vehicle cabin. The decompression unit decompresses the refrigerant having radiated heat in the heat radiating unit. The outside air heat absorbing unit causes the refrigerant decompressed by the decompression unit to absorb heat from outside air. The waste heat absorbing unit causes the refrigerant decompressed by the decompression unit to absorb waste heat of a waste heat device. The shutter opens and closes to regulate an opening of a passage for the outside air introduced into the outside air heat absorbing unit. The control unit closes the shutter in a case where it is determined that an amount of waste heat of the waste heat device is larger than an amount of heat absorbed by the refrigerant in the outside air heat absorbing unit and the waste heat absorbing unit.

BRIEF DESCRIPTION OF DRAWINGS

The foregoing and other objects, features, and advantages of the present disclosure will become more apparent from the following detailed description with reference to the accompanying drawings.

DESCRIPTION OF EMBODIMENTS

Figure 1:
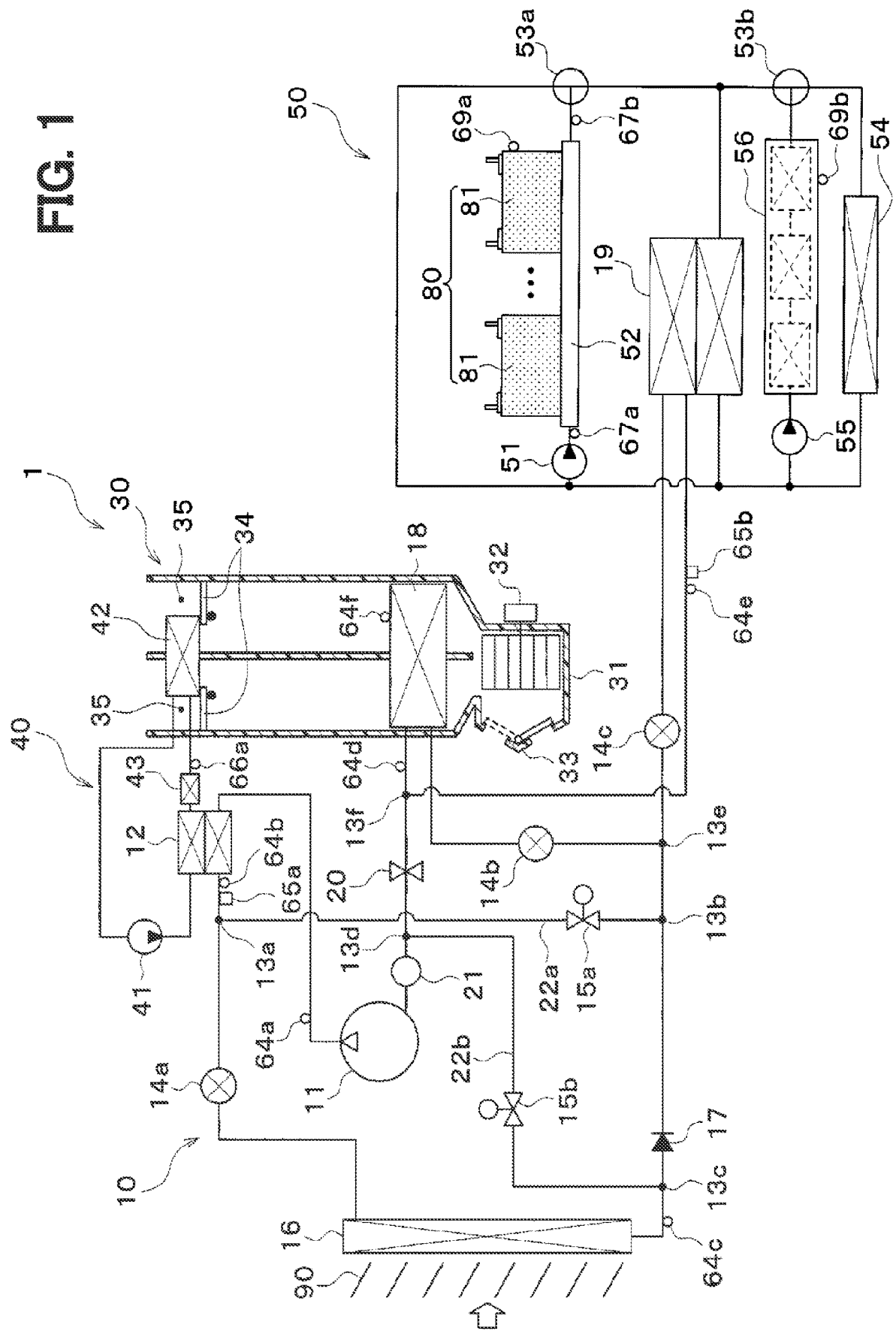
FIG. 1 is an overall configuration diagram of a vehicle air conditioner according to a first embodiment.

To begin with, examples of relevant techniques will be described. A refrigeration cycle device for a vehicle includes a heat exchanger that functions as a condenser when the air in a vehicle cabin is cooled and functions as an evaporator when the air in the vehicle cabin is heated.

The path through which air flows from the outside of a vehicle toward the heat exchanger is opened and closed by a shutter device. In a case where the heat exchanger functions as a condenser, the shutter device is opened, and in the heat exchanger, a refrigerant is condensed by radiating heat to the air flowing from the outside of the vehicle. In a case where the heat exchanger functions as an evaporator, the shutter device is closed, and in the heat exchanger, the air outside the vehicle does not flow into the heat exchanger, and the refrigerant evaporates by absorbing waste heat of an engine. That is, energy saving of the vehicle is achieved by performing air-heating in the vehicle cabin using the waste heat of the engine.

In this conventional technique, if the waste of the engine cannot be sufficiently obtained in a case where the heat exchanger functions as an evaporator, air-heating in the vehicle cabin cannot be sufficiently performed. For example, in a vehicle in which the frequency of operation of the engine is low such as a hybrid vehicle, the waste heat of the engine may be less than the amount of heat necessary for air-heating, and thus the air in the vehicle cabin may not be sufficiently heated. Therefore, energy saving may not be sufficiently achieved.

The present disclosure provides a refrigeration cycle device that can effectively save energy for a vehicle.

According to an aspect of the present disclosure, a refrigeration cycle device includes a compressor, a heat radiating unit, a decompression unit, an outside air heat absorbing unit, a waste heat absorbing unit, a shutter and a control unit.

The compressor sucks, compresses, and discharges a refrigerant. The heat radiating unit causes the refrigerant discharged from the compressor to radiate heat to heat air supplied to a space inside a vehicle cabin. The decompression unit decompresses the refrigerant having radiated heat in the heat radiating unit. The outside air heat absorbing unit causes the refrigerant decompressed by the decompression unit to absorb heat from outside air. The waste heat absorbing unit causes the refrigerant decompressed by the decompression unit to absorb waste heat of a waste heat device. The shutter opens and closes to regulate an opening of a passage for the outside air introduced into the outside air heat absorbing unit.

The control unit closes the shutter in a case where it is determined that an amount of waste heat of the waste heat device is larger than an amount of heat absorbed by the refrigerant in the outside air heat absorbing unit and the waste heat absorbing unit.

Accordingly, not only the waste heat absorbing unit absorbs heat from the waste heat device, but also the outside air heat absorbing unit absorbs heat from outside air to perform air-heating, so that energy saving of air-heating can be achieved. Furthermore, in a case where the outside air heat absorbing unit does not need to absorb heat from outside air for air-heating, the shutter is closed, so that the travel resistance of the vehicle can be reduced and energy saving of the vehicle can be achieved.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described with reference to FIGS. 1 to 13. In the present embodiment, a refrigeration cycle device 10 is applied to a vehicle air conditioner 1 mounted on an electric vehicle that obtains driving force for traveling from an electric motor. The vehicle air conditioner 1 is an air conditioner with a battery temperature regulation function. The vehicle air conditioner 1 performs air conditioning in a vehicle cabin space that is a space to be air-conditioned, and also regulate the temperature of a battery 80.

The battery 80 is a secondary battery that stores electric power supplied to an in-vehicle device such as an electric motor. The battery 80 of the present embodiment is a lithium ion battery. The battery 80 is a so-called assembled battery formed by stacking and arranging a plurality of battery cells 81 and electrically connecting these battery cells 81 in series or in parallel.

The output of this type of battery is likely to decrease at a low temperature, and the battery is likely to deteriorate at a high temperature. Therefore, the temperature of the battery needs to be maintained within an appropriate temperature range (in the present embodiment, equal to or higher than 15° C. and equal to or lower than 55° C.) in which the charge and discharge capacity of the battery can be sufficiently utilized.

Therefore, in the vehicle air conditioner 1, the battery 80 can be cooled by cold generated by the refrigeration cycle device 10. The cooling target (in other words, the heat absorbing object) in the refrigeration cycle device 10 of the present embodiment is air and the battery 80. The battery 80 is a waste heat device that generates waste heat during operation.

As illustrated in the overall configuration diagram of FIG. 1, the vehicle air conditioner 1 includes the refrigeration cycle device 10, an inside air conditioning unit 30, a high-temperature-side heat medium circuit 40, a low-temperature-side heat medium circuit 50, and the like.

In order to perform air conditioning in the vehicle cabin, the refrigeration cycle device 10 cools air supplied to the vehicle cabin and heats a high-temperature-side heat medium circulating in the high-temperature-side heat medium circuit 40. In order to cool the battery 80, the refrigeration cycle device 10 cools a low-temperature-side heat medium circulating in the low-temperature-side heat medium circuit 50.

The refrigeration cycle device 10 can switch refrigerant circuits in various operation modes in order to perform air conditioning in the vehicle cabin. For example, switching between a refrigerant circuit in an air-cooling mode, a refrigerant circuit in a dehumidifying and air-heating mode, a refrigerant circuit in an air-heating mode, and the like can be performed. The refrigeration cycle device 10 can switch between an operation mode in which the battery 80 is cooled and an operation mode in which the battery 80 is not cooled in the individual air conditioning operation modes.

The refrigeration cycle device 10 uses an HFO refrigerant (specifically, R1234yf) as a refrigerant, and configures a vapor compression subcritical refrigeration cycle in which the pressure of a discharge refrigerant discharged from a compressor 11 does not exceed the critical pressure of the refrigerant. Refrigerant oil for lubricating the compressor 11 is mixed with the refrigerant. A part of the refrigerant oil circulates in the cycle together with the refrigerant.

Among the components of the refrigeration cycle device 10, the compressor 11 sucks, compresses, and discharges the refrigerant in the refrigeration cycle device 10. The compressor 11 is disposed on the front side of the vehicle cabin, and is also disposed in a drive unit chamber that houses an electric motor and the like. The compressor 11 is an electric compressor in which a fixed capacity type compression mechanism with a fixed discharge capacity is rotationally driven by an electric motor. The rotation speed (that is, the refrigerant discharge capability) of the compressor 11 is controlled by a control signal output from a cycle control device 60.

The inlet port side of a refrigerant passage in a water-refrigerant heat exchanger 12 is connected to a discharge port of the compressor 11. The water-refrigerant heat exchanger 12 includes a refrigerant passage in which the high-pressure refrigerant discharged from the compressor 11 flows, and a water passage in which the high-temperature-side heat medium circulating in the high-temperature-side heat medium circuit 40 flows. The water-refrigerant heat exchanger 12 is a heating heat exchanger that exchanges heat between the high-pressure refrigerant flowing in the refrigerant passage and the high-temperature-side heat medium flowing in the water passage to heat the high-temperature-side heat medium.

The inlet port side of a first three-way joint 13a having three inlet and outlet ports communicating with each other is connected to the outlet port of the refrigerant passage in the water-refrigerant heat exchanger 12. As such a three-way joint, a three-way joint formed by joining a plurality of pipes or a three-way joint formed by providing a plurality of refrigerant passages in a metal block or a resin block can be used.

The refrigeration cycle device 10 includes second to sixth three-way joints 13b to 13f. The basic configurations of the second to the sixth three-way joints 13b to 13f are similar to that of the first three-way joint 13a.

The inlet port side of an air-heating expansion valve 14a is connected to one outlet port of the first three-way joint 13a. One inlet port side of the second three-way joint 13b is connected to the other outlet port of the first three-way joint 13a through a bypass passage 22a. A dehumidifying on-off valve 15a is disposed in the bypass passage 22a.

The dehumidifying on-off valve 15a is an electromagnetic valve that opens and closes a refrigerant passage connecting the other outlet port side of the first three-way joint 13a and the one inlet port side of the second three-way joint 13b. The refrigeration cycle device 10 includes an air-heating on-off valve 15b. The basic configuration of the air-heating on-off valve 15b is similar to that of the dehumidifying on-off valve 15a.

The dehumidifying on-off valve 15a and the air-heating on-off valve 15b can switch the refrigerant circuit in each operation mode by opening and closing the refrigerant passage. The dehumidifying on-off valve 15a and the air-heating on-off valve 15b are refrigerant circuit switching units that switch the refrigerant circuit in the cycle. The operations of the dehumidifying on-off valve 15a and the air-heating on-off valve 15b are controlled by a control voltage output from the cycle control device 60.

The air-heating expansion valve 14a is an air-heating decompression unit that decompresses the high-pressure refrigerant flowing out of the refrigerant passage of the water-refrigerant heat exchanger 12 and regulates the flow rate (the mass flow rate) of the refrigerant flowing to the downstream side in an operation mode of at least performing air-heating in the vehicle cabin. The air-heating expansion valve 14a is an electric variable throttle mechanism including a valve body configured to be able to change a throttle opening and an electric actuator that changes the opening of the valve body.

The refrigeration cycle device 10 includes an air-cooling expansion valve 14b and a chiller expansion valve 14c. The basic configurations of the air-cooling expansion valve 14b and the chiller expansion valve 14c are similar to that of the air-heating expansion valve 14a.

The air-heating expansion valve 14a, the air-cooling expansion valve 14b, and the chiller expansion valve 14c have a full-open function of functioning as a simple refrigerant passage without exhibiting a flow-rate regulating action and a refrigerant decompression action by fully opening the valve opening, and a full-close function of closing the refrigerant passage by fully closing the valve opening.

The full-open function and the full-close function enable the air-heating expansion valve 14a, the air-cooling expansion valve 14b, and the chiller expansion valve 14c to switch the refrigerant circuit in each operation mode. The air-heating expansion valve 14a, the air-cooling expansion valve 14b, and the chiller expansion valve 14c function as a refrigerant circuit switching unit. The air-heating expansion valve 14a, the air-cooling expansion valve 14b, and the chiller expansion valve 14c are controlled by a control signal (a control pulse) output from the cycle control device 60.

The refrigerant inlet port side of an outside heat exchanger 16 is connected to the outlet port of the air-heating expansion valve 14a. The outside heat exchanger 16 is a heat exchanger that exchanges heat between the refrigerant flowing out of the air-heating expansion valve 14a and outside air supplied by a cooling fan (not illustrated). The outside heat exchanger 16 is disposed on the front side of the drive unit chamber. As a result, during traveling of the vehicle, traveling air can be applied to the outside heat exchanger 16. The outside heat exchanger 16 is an outside air heat radiating unit that radiates heat from the refrigerant to the outside air, and is also an outside air heat absorbing unit that causes the refrigerant to absorb heat from the outside air.

A shutter 90 is disposed on the front side of the outside heat exchanger 16 in the drive unit chamber. The shutter 90 opens and closes so as to regulate the opening of a passage through which air flows from the outside of the vehicle toward the outside heat exchanger 16 in the drive unit chamber. In a case where the shutter 90 is opened, air flows from the outside of the vehicle toward the outside heat exchanger 16. In a case where the shutter 90 is closed, air hardly flows from the outside of the vehicle toward the outside heat exchanger 16. The shutter 90 is controlled by a control signal (a control pulse) output from the cycle control device 60.

The inlet port side of the third three-way joint 13c is connected to the refrigerant outlet port of the outside heat exchanger 16. One inlet port side of the fourth three-way joint 13d is connected to one outlet port of the third three-way joint 13c through an air-heating passage 22b. The air-heating on-off valve 15b that opens and closes the refrigerant passage is disposed in the air-heating passage 22b.

The other inlet port side of the second three-way joint 13b is connected to the other outlet port of the third three-way joint 13c. A check valve 17 is disposed in a refrigerant passage connecting the other outlet port side of the third three-way joint 13c and the other inlet port side of the second three-way joint 13b. The check valve 17 allows the refrigerant to flow from the side of the third three-way joint 13c to the side of the second three-way joint 13b, and prohibits the refrigerant from flowing from the side of the second three-way joint 13b to the side of the third three-way joint 13c.

The inlet port side of the fifth three-way joint 13e is connected to the outlet port of the second three-way joint 13b. The inlet port side of the air-cooling expansion valve 14b is connected to one outlet port of the fifth three-way joint 13e. The inlet port side of the chiller expansion valve 14c is connected to the other outlet port of the fifth three-way joint 13e.

The air-cooling expansion valve 14b is an air conditioning decompression unit that decompresses the refrigerant flowing out of the outside heat exchanger 16 and regulates the flow rate of the refrigerant flowing to the downstream side in an operation mode of at least performing air-cooling in the vehicle cabin.

The refrigerant inlet port side of an inside evaporator 18 is connected to the outlet port of the air-cooling expansion valve 14b. The inside evaporator 18 is disposed in an air conditioning casing 31 of the inside air conditioning unit 30. The inside evaporator 18 is an air conditioning evaporation unit that exchanges heat between the low-pressure refrigerant decompressed by the air-cooling expansion valve 14*b* and air supplied from a blower 32 to evaporate the low-pressure refrigerant, and cools air by causing the low-pressure refrigerant to exhibit a heat absorbing action. One inlet port side of the sixth three-way joint 13*f* is connected to the refrigerant outlet port of the inside evaporator 18.

The chiller expansion valve 14*c* is a battery decompression unit that decompresses the refrigerant flowing out of the outside heat exchanger 16 and regulates the flow rate of the refrigerant flowing to the downstream side in an operation mode of at least cooling the battery 80.

The inlet port side of a refrigerant passage in a chiller 19 is connected to the outlet port of the chiller expansion valve 14*c*. The chiller 19 includes a refrigerant passage in which the low-pressure refrigerant decompressed by the chiller expansion valve 14*c* flows, and a water passage in which the low-temperature-side heat medium circulating in the low-temperature-side heat medium circuit 50 flows. The chiller 19 is an evaporation unit that exchanges heat between the low-pressure refrigerant flowing through the refrigerant passage and the low-temperature-side heat medium flowing through the water passage to evaporate the low-pressure refrigerant and exhibit the heat absorbing action. The chiller 19 is a waste heat absorbing unit that causes the refrigerant to absorb the waste heat of the battery 80. The other inlet port side of the sixth three-way joint 13*f* is connected to the outlet port of the refrigerant passage in the chiller 19.

The inlet port side of an evaporation pressure regulating valve 20 is connected to the outlet port of the sixth three-way joint 13*f*. The evaporation pressure regulating valve 20 maintains the refrigerant evaporation pressure in the inside evaporator 18 at a predetermined reference pressure or higher in order to suppress frosting of the inside evaporator 18. The evaporation pressure regulating valve 20 is a mechanical variable throttle mechanism that increases the valve opening as the pressure of the refrigerant on the outlet side of the inside evaporator 18 increases.

The evaporation pressure regulating valve 20 thus maintains the refrigerant evaporation temperature in the inside evaporator 18 at a frosting suppression temperature (in the present embodiment, 1° C.) or higher, at which the frosting of the inside evaporator 18 can be suppressed. The evaporation pressure regulating valve 20 is disposed on the downstream side of the sixth three-way joint 13*f* as a merging portion in a refrigerant flow. The evaporation pressure regulating valve 20 thus maintains the refrigerant evaporation temperature of the chiller 19 at the frosting suppression temperature or higher.

The other inlet port side of the fourth three-way joint 13*d* is connected to the outlet port of the evaporation pressure regulating valve 20. The inlet port side of an accumulator 21 is connected to the outlet port of the fourth three-way joint 13*d*. The accumulator 21 is a gas-liquid separation unit that separates the refrigerant flowing into the accumulator into gas and liquid and stores an excess liquid-phase refrigerant in the cycle. The suction port side of the compressor 11 is connected to the gas-phase refrigerant outlet port of the accumulator 21.

The accumulator 21 includes an oil return hole for returning refrigerating machine oil mixed in the separated liquid-phase refrigerant to the compressor 11. The refrigerating machine oil in the accumulator 21 is returned to the compressor 11 together with a small amount of the liquid-phase refrigerant.

The fifth three-way joint 13*e* of the present embodiment is a branch portion that branches the flow of the refrigerant flowing out of the outside heat exchanger 16. The sixth three-way joint 13*f* is a merging portion where the flow of the refrigerant flowing out of the inside evaporator 18 and the flow of the refrigerant flowing out of the chiller 19 are merged to flow to the suction side of the compressor 11.

The inside evaporator 18 and the chiller 19 are connected in parallel to each other with respect to a refrigerant flow. The bypass passage 22*a* guides the refrigerant flowing out of the refrigerant passage of the water-refrigerant heat exchanger 12 to the upstream side of the branch portion. The air-heating passage 22*b* guides the refrigerant flowing out of the outside heat exchanger 16 to the suction port side of the compressor 11.

The high-temperature-side heat medium circuit 40 is a heat medium circulation circuit that circulates a high-temperature-side heat medium. As the high-temperature-side heat medium, a solution containing ethylene glycol, dimethylpolysiloxane, nanofluid, or the like, an antifreeze solution, or the like can be used. In the high-temperature-side heat medium circuit 40, the water passage of the water-refrigerant heat exchanger 12, a high-temperature-side heat medium pump 41, a heater core 42, an electric heater 43, and the like are disposed.

The high-temperature-side heat medium pump 41 is a water pump that pumps the high-temperature-side heat medium to the inlet port side of the water passage in the water-refrigerant heat exchanger 12. The high-temperature-side heat medium pump 41 is an electric pump whose rotation speed (that is, pumping capability) is controlled by a control voltage output from the cycle control device 60.

The heat-medium inlet port side of the heater core 42 is connected to the outlet port of the water passage in the water-refrigerant heat exchanger 12. The heater core 42 is a heat exchanger that exchanges heat between the high-temperature-side heat medium heated by the water-refrigerant heat exchanger 12 and air passing through the inside evaporator 18 to heat the air. The heater core 42 is disposed in the air conditioning casing 31 of the inside air conditioning unit 30. The suction port side of the high-temperature-side heat medium pump 41 is connected to the heat-medium outlet port of the heater core 42.

Therefore, in the high-temperature-side heat medium circuit 40, the high-temperature-side heat medium pump 41 regulates the flow rate of the high-temperature-side heat medium flowing into the heater core 42, so that the amount of heat radiated from the high-temperature-side heat medium in the heater core 42 to the air (that is, the amount of air heated in the heater core 42) can be regulated.

The electric heater 43 is, for example, a PTC heater having a PTC element (that is, a positive characteristic thermistor). The electric heater 43 can freely regulate the amount of heat for heating the high-temperature-side heat medium by a control voltage output from the cycle control device 60.

The water-refrigerant heat exchanger 12 and the individual components of the high-temperature-side heat medium circuit 40 are heating units that heat air by using the refrigerant discharged from the compressor 11 as a heat source.

The low-temperature-side heat medium circuit 50 is a heat medium circulation circuit that circulates a low-temperature-side heat medium. As the low-temperature-side heat medium, a fluid similar to the high-temperature-side heat medium can be used. In the low-temperature-side heat medium circuit 50, the water passage of the chiller 19, a first low-temperature-side heat medium pump 51, a cooling heat exchange unit 52, a first three-way valve 53a, a low-temperature-side radiator 54, a second low-temperature-side heat medium pump 55, a cooling target equipment 56, and the like are disposed.

The first low-temperature-side heat medium pump 51 is a water pump that pumps the low-temperature-side heat medium to the inlet port side of the cooling heat exchange unit 52. The second low-temperature-side heat medium pump 55 is a water pump that pumps the low-temperature-side heat medium to the inlet port side of the cooling target equipment 56. The basic configurations of the first low-temperature-side heat medium pump 51 and the second low-temperature-side heat medium pump 55 are similar to that of the high-temperature-side heat medium pump 41.

The cooling target equipment 56 is a waste heat device that generates waste heat during operation, and is, for example, an inverter, a motor generator, an ADAS control device, or the like. The inverter and the motor generator have characteristics that the amount of waste heat increases as the travel load (for example, the travel speed) of the vehicle increases.

The cooling heat exchange unit 52 includes a heat medium flow path. The cooling heat exchange unit 52 is cooled by a low-temperature-side heat medium flowing through the heat medium flow path.

One inlet port side of the first three-way valve 53a and one inlet port side of a second three-way valve 53b are connected to the outlet port of the water passage in the chiller 19. The first three-way valve 53a and the second three-way valve 53b are electric three-way flow rate regulating valves each of which has one inlet port and two outlet ports and is capable of continuously regulating a passage area ratio of the two outlet ports. The first three-way valve 53a and the second three-way valve 53b are controlled by a control voltage output from the cycle control device 60.

The suction port side of the first low-temperature-side heat medium pump 51 is connected to one outlet of the first three-way valve 53a, and the inlet port side of the water passage in the chiller 19 is connected to the other outlet port of the first three-way valve 53a. The inlet port side of the cooling heat exchange unit 52 is connected to the discharge port of the first low-temperature-side heat medium pump 51. The cooling heat exchange unit 52 includes a plurality of metal heat medium flow paths arranged so as to be in contact with the plurality of battery cells 81. The cooling heat exchange unit 52 is a heat exchange unit that exchanges heat between the low-temperature-side heat medium flowing through the heat medium passage and the battery cell 81 to cool the battery 80.

The cooling heat exchange unit 52 is formed by disposing the heat medium flow path between stacked battery cells 81. The cooling heat exchange unit 52 may be formed integrally with the battery 80. For example, the heat medium flow path may be provided in a dedicated case that houses the stacked battery cells 81 so as to be formed integrally with the battery 80. The other inlet port side of the first three-way valve 53a is connected to the outlet port of the cooling heat exchange unit 52.

The heat medium inlet port side of the low-temperature-side radiator 54 is connected to one outlet port of the second three-way valve 53b, and the inlet port side of the water passage in the chiller 19 is connected to the other outlet port of the second three-way valve 53b.

The low-temperature-side radiator 54 is a heat exchanger that exchanges heat between the refrigerant flowing out of the cooling heat exchange unit 52 and outside air supplied by an outside air fan (not illustrated) to radiate heat of the low-temperature-side heat medium to the outside air.

The low-temperature-side radiator 54 is also a heat exchanger that exchanges heat between the refrigerant flowing out of the cooling heat exchange unit 52 and outside air supplied by an outside air fan (not illustrated) to cause the low-temperature-side heat medium to absorb heat of the outside air.

The low-temperature-side radiator 54 is disposed on the front side of the drive unit chamber. As a result, during traveling of the vehicle, traveling air can be applied to the low-temperature-side radiator 54. The low-temperature-side radiator 54 is disposed in series with the outside heat exchanger 16 in an air flow. The low-temperature-side radiator 54 may be disposed in parallel with the outside heat exchanger 16 in the air flow. The low-temperature-side radiator 54 may be formed integrally with the outside heat exchanger 16 and the like. The opening of the passage through which air flows toward the low-temperature-side radiator 54 is regulated by the shutter 90.

The suction port side of the second low-temperature-side heat medium pump 55 and the inlet port side of the water passage in the chiller 19 are connected to the heat medium outlet port of the low-temperature-side radiator 54. The inlet port side of the water passage in the cooling target equipment 56 is connected to the discharge port of the second low-temperature-side heat medium pump 55.

In the low-temperature-side heat medium circuit 50, by the first low-temperature-side heat medium pump 51, the second low-temperature-side heat medium pump 55, the first three-way valve 53a, and the second three-way valve 53b regulating the flow rate of the low-temperature-side heat medium flowing into the chiller 19, the cooling heat exchange unit 52, the low-temperature-side radiator 54, and the cooling target equipment 56, it is possible to regulate the amount of heat absorbed by the low-temperature-side heat medium in the cooling heat exchange unit 52 from the battery 80 and the amount of heat absorbed by the low-temperature-side heat medium from the cooling target equipment 56.

The chiller 19 and the individual components of the low-temperature-side heat medium circuit 50 are cooling units that cool the battery 80 and the cooling target equipment 56 by evaporating the refrigerant flowing out of the chiller expansion valve 14c. The chiller 19 and the individual components of the low-temperature-side heat medium circuit 50 are waste heat absorbing units that cause the refrigerant to absorb the waste heat of the battery 80 and the cooling target equipment 56.

The outside heat exchanger 16 that is an outside air heat absorbing unit, the chiller 19 that is a waste heat absorbing unit, and the individual components of the low-temperature-side heat medium circuit 50 are heat absorbing units that cause the refrigerant to absorb heat from outside air and cause the refrigerant to absorb waste heat of the battery 80 and the cooling target equipment 56.

The inside air conditioning unit 30 blows air whose temperature has been regulated by the refrigeration cycle device 10 into the vehicle cabin. The inside air conditioning unit 30 is disposed inside an instrument panel at the foremost of the vehicle cabin.

As illustrated in FIG. 1, the inside air conditioning unit 30 houses the blower 32, the inside evaporator 18, the heater core 42, and the like inside an air passage formed in the air conditioning casing 31 forming the outer shell of the inside air conditioning unit 30.

The air conditioning casing 31 forms an air passage for air to be supplied to the vehicle cabin. The air conditioning casing 31 is formed of resin (for example, polypropylene) that has a certain degree of elasticity and excellent strength.

An inside-air and outside-air switching device 33 is disposed on the most upstream side of the air conditioning casing 31 in an air flow. The inside-air and outside-air switching device 33 switches inside air (air inside the vehicle cabin) and outside air (air outside the vehicle cabin), and introduces the air into the air conditioning casing 31.

The inside-air and outside-air switching device 33 continuously regulates the opening areas of an inside-air introduction port through which inside air is introduced into the air conditioning casing 31 and an outside-air introduction port through which outside air is introduced into the air conditioning casing by an inside-air and outside-air switching door, thereby changing an introduction ratio between the volume of the inside air introduced and the volume of the outside air introduced. The inside-air and outside-air switching door is driven by an inside-air and outside-air switching door electric actuator. The inside-air and outside-air switching door electric actuator is controlled by a control signal output from the cycle control device 60.

The blower 32 is disposed on the downstream side of the inside-air and outside-air switching device 33 in the air flow. The blower 32 supplies air sucked through the inside-air and outside-air switching device 33 to the vehicle cabin. The blower 32 is an electric ventilator that drives a centrifugal multi-blade fan with an electric motor. The rotation speed (that is, the ventilation capability) of the blower 32 is controlled by a control voltage output from the cycle control device 60.

On the downstream side of the blower 32 in the air flow, the inside evaporator 18 and the heater core 42 are disposed in this order with respect to the air flow. The inside evaporator 18 is disposed on the upstream side of the heater core 42 in the air flow.

A cold air bypass passage 35 in which the air after passing through the inside evaporator 18 flows while bypassing the heater core 42 is provided in the air conditioning casing 31. An air mix door 34 is disposed on the downstream side of the inside evaporator 18 in the air flow and on the upstream side of the heater core 42 in the air flow in the air conditioning casing 31.

The air mix door 34 is an air-volume-ratio regulating unit that regulates an air volume ratio between the volume of air passing through the side of the heater core 42 and the volume of air passing through the cold air bypass passage 35 in the air after passing through the inside evaporator 18. The air mix door 34 is driven by an air mix door electric actuator. The electric actuator is controlled by a control signal output from the cycle control device 60.

A mixing space is disposed on the downstream side of the heater core 42 and the cold air bypass passage 35 in the air flow in the air conditioning casing 31. The mixing space is a space for mixing air heated by the heater core 42 and air passing through the cold air bypass passage 35 and not heated.

Openings for blowing air (that is, conditioned air) mixed in the mixing space into the vehicle cabin that is a space to be air-conditioned are arranged in the downstream portion of the air conditioning casing 31 in the air flow.

As the openings, a face opening, a foot opening, and a defroster opening (all not illustrated) are formed. The face opening is an opening for blowing conditioned air toward the upper body of a passenger in the vehicle cabin. The foot opening is an opening for blowing conditioned air toward the feet of the passenger in the vehicle cabin. The defroster opening is an opening for blowing conditioned air toward the inside surface of a vehicle front window glass.

The face opening, the foot opening, and the defroster opening are respectively connected to a face blow-out port, a foot blow-out port, and a defroster blow-out port (all not illustrated) formed in the vehicle cabin through ducts forming air passages.

The temperature of the conditioned air to be mixed in the mixing space is regulated by the air mix door 34 regulating the air volume ratio between the volume of air passing through the heater core 42 and the volume of air passing through the cold air bypass passage 35. As a result, the temperature of air (conditioned air) blown into the vehicle cabin from each of the blow-out ports is regulated.

A face door, a foot door, and a defroster door (all not illustrated) are arranged on the upstream side of the face opening, the foot opening, and the defroster opening, respectively, in the air flow. The face door regulates the opening area of the face opening. The foot door regulates the opening area of the foot opening. The defroster door regulates the opening area of the defroster opening.

The face door, the foot door, and the defroster door constitute a blow-out port mode switching device that switches a blow-out port mode. These doors are connected to an electric actuator for driving a blow-out port mode door via a link mechanism or the like, and are rotated in conjunction therewith. The operation of the electric actuator is also controlled by a control signal output from the cycle control device 60.

Specific examples of the blow-out port mode switched by the blow-out port mode switching device include a face mode, a bi-level mode, and a foot mode.

The face mode is a blow-out port mode in which the face blow-out port is fully opened and air is blown from the face blow-out port toward the upper body of the passenger in the vehicle cabin. The bi-level mode is a blow-out port mode in which both the face blow-out port and the foot blow-out port are opened and air is blown toward the upper body and the feet of the passenger in the vehicle cabin. The foot mode is a blow-out port mode in which the foot blow-out port is fully opened and the defroster blow-out port is opened with a small opening and air is mainly blown from the foot blow-out port.

The blow-out port mode can be switched to the defroster mode by the passenger manually operating a blow-out mode selector switch provided on an operation panel 70. The defroster mode is a blow-out port mode in which the defroster blow-out port is fully opened and air is blown out from the defroster blow-out port to the inside surface of the front window glass.

Next, the outline of an electric control unit in the present embodiment will be described. The cycle control device 60 includes a known microcomputer including a CPU, a ROM, a RAM, and the like, and peripheral circuits thereof. Various calculations and processes are performed on the basis of a control program stored in the ROM, and the operations of the various control target devices 11, 14a to 14c, 15a, 15b, 32, 41, 43, 51, and 53 connected to the output side are controlled.

Figure 2:
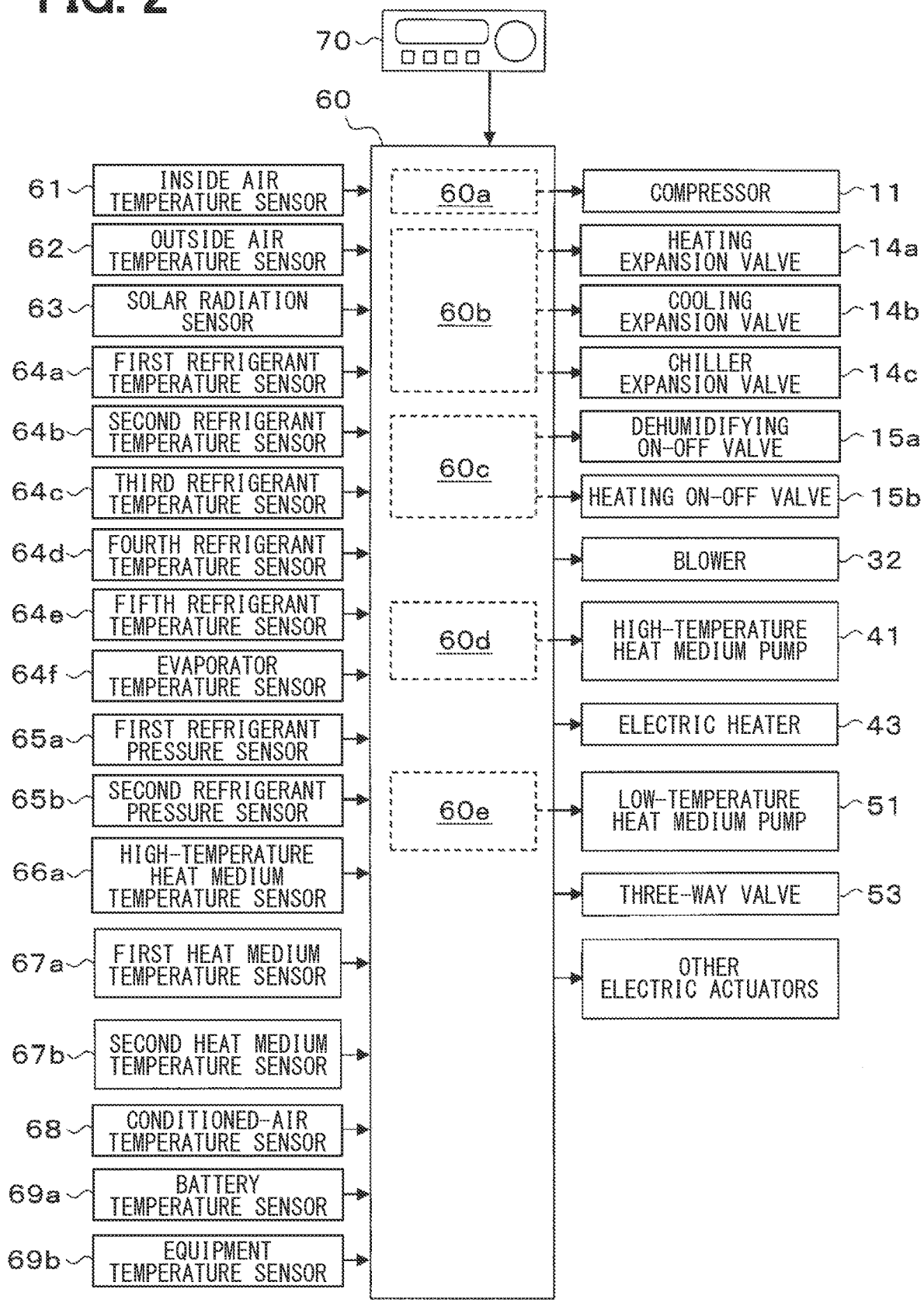
FIG. 2 is a block diagram illustrating an electric control unit of the vehicle air conditioner according to the first embodiment.

As illustrated in the block diagram of FIG. 2, an inside air temperature sensor 61, an outside air temperature sensor 62, a solar radiation sensor 63, first to fifth refrigerant temperature sensors 64a to 64e, an evaporator temperature sensor 64f, first and second refrigerant pressure sensors 65a and 65b, a high-temperature-side heat medium temperature sensor 66a, first and second low-temperature-side heat medium temperature sensors 67a and 67b, a conditioned air temperature sensor 68, a battery temperature sensor 69, and the like are connected to the input side of the cycle control device 60. Detection signals of these sensor groups are input to the cycle control device 60.

The inside air temperature sensor 61 is an inside air temperature detection unit that detects an inside air temperature Tr (that is, a vehicle cabin temperature). The outside air temperature sensor 62 is an outside air temperature detection unit that detects an outside air temperature Tam (that is, a temperature outside the vehicle cabin). The solar radiation sensor 63 is a solar-radiation amount detection unit that detects a solar radiation amount Ts with which the vehicle cabin is irradiated.

The first refrigerant temperature sensor 64a is a discharge refrigerant temperature detection unit that detects a temperature T1 of the refrigerant discharged from the compressor 11. The second refrigerant temperature sensor 64b is a second refrigerant temperature detection unit that detects a temperature T2 of the refrigerant flowing out of the refrigerant passage of the water-refrigerant heat exchanger 12. The third refrigerant temperature sensor 64c is a third refrigerant temperature detection unit that detects a temperature T3 of the refrigerant flowing out of the outside heat exchanger 16.

The fourth refrigerant temperature sensor 64d is a fourth refrigerant temperature detection unit that detects a temperature T4 of the refrigerant flowing out of the inside evaporator 18. The fifth refrigerant temperature sensor 64e is a fifth refrigerant temperature detection unit that detects a temperature T5 of the refrigerant flowing out of the refrigerant passage of the chiller 19.

The evaporator temperature sensor 64f is an evaporator temperature detection unit that detects an evaporator temperature Tefin that is a refrigerant evaporation temperature in the inside evaporator 18. The evaporator temperature sensor 64f of the present embodiment detects the heat-exchange fin temperature of the inside evaporator 18.

The first refrigerant pressure sensor 65a is a first refrigerant pressure detection unit that detects a pressure P1 of the refrigerant flowing out of the refrigerant passage of the water-refrigerant heat exchanger 12. The second refrigerant pressure sensor 65b is a second refrigerant pressure detection unit that detects a pressure P2 of the refrigerant flowing out of the refrigerant passage of the chiller 19.

The high-temperature-side heat medium temperature sensor 66a is a high-temperature-side heat medium temperature detection unit that detects a high-temperature-side heat medium temperature TWH that is the temperature of the high-temperature-side heat medium flowing out of the water passage of the water-refrigerant heat exchanger 12.

The first low-temperature-side heat medium temperature sensor 67a is a first low-temperature-side heat medium temperature detection unit that detects a first low-temperature-side heat medium temperature TWL1 that is the temperature of the low-temperature-side heat medium flowing out of the water passage of the chiller 19. The second low-temperature-side heat medium temperature sensor 67b is a second low-temperature-side heat medium temperature detection unit that detects a second low-temperature-side heat medium temperature TWL2 that is the temperature of the low-temperature-side heat medium flowing out of the cooling heat exchange unit 52.

The conditioned air temperature sensor 68 is a conditioned air temperature detection unit that detects a temperature TAV of air supplied to the vehicle cabin from the mixing space.

The battery temperature sensor 69 is a battery temperature detection unit that detects a battery temperature TB (that is, the temperature of the battery 80). The battery temperature sensor 69 of the present embodiment includes a plurality of temperature sensors, and detects temperatures at a plurality of portions of the battery 80. As a result, the cycle control device 60 can also detect a temperature difference between the individual parts of the battery 80. The average value of detection values of the plurality of temperature sensors is used as the battery temperature TB.

The equipment temperature sensor 69b is a third low-temperature-side heat medium temperature detection unit that detects a third low-temperature-side heat medium temperature TWL3 that is the temperature of the low-temperature-side heat medium flowing out of the cooling target equipment 56.

As illustrated in FIG. 2, the operation panel 70 disposed near the instrument panel at the front of the vehicle cabin is connected to the input side of the cycle control device 60, and operation signals from various operation switches provided on the operation panel 70 are input.

Specific examples of the various operation switches provided on the operation panel 70 include an automatic switch that sets or cancels automatic control operation of the vehicle air conditioner, an air conditioner switch that requests cooling of air by the inside evaporator 18, an air volume setting switch that manually sets the air volume of the blower 32, a temperature setting switch that sets a target temperature Tset in the vehicle cabin, and a blowing mode selector switch that manually sets a blowing mode.

Note that the cycle control device 60 of the present embodiment is integrally configured with a control unit that controls various control target devices connected to the output side of the control device. A configuration (hardware and software) that controls the operation of each control target device in the cycle control device 60 is a control unit that controls the operation of each control target device.

For example, the configuration in the cycle control device 60 that controls the refrigerant discharge capability of the compressor 11 (specifically, the rotation speed of the compressor 11) is a compressor control unit 60a. The configuration of controlling the operations of the air-heating expansion valve 14a, the air-cooling expansion valve 14b, and the chiller expansion valve 14c is an expansion valve control unit 60b. The configuration of controlling the operations of the dehumidifying on-off valve 15a and the air-heating on-off valve 15b is a refrigerant circuit switching control unit 60c.

Furthermore, the configuration of controlling the pumping capability of the high-temperature-side heat medium in the high-temperature-side heat medium pump 41 is a high-temperature-side heat medium pump control unit 60d. The configuration of controlling the pumping capability of the low-temperature-side heat medium in the first low-temperature-side heat medium pump 51 is a low-temperature-side heat medium pump control unit 60e.

Next, the operation of the present embodiment with the above configuration will be described. The vehicle air conditioner 1 of the present embodiment performs air conditioning in the vehicle cabin and also regulates the temperatures of the battery 80 and the cooling target equipment 56. In the refrigeration cycle device 10, the air-cooling operation, the air-heating operation, and the dehumidifying and air-heating operation can be performed by switching refrigerant circuits.

In the air-cooling operation, air-cooling in the vehicle cabin is performed by the inside evaporator 18 cooling air and blowing the air into the vehicle cabin. In the air-cooling operation, the battery 80 and the cooling target equipment 56 can also be cooled as necessary.

In the dehumidifying and air-heating operation, dehumidification and air-heating in the vehicle cabin is performed by reheating the air cooled and dehumidified by the inside evaporator 18 with the heater core 42 and blowing the air into the vehicle cabin. In the dehumidifying and air-heating operation, the battery 80 and the cooling target equipment 56 can also be cooled as necessary.

In the air-heating operation, air-heating in the vehicle cabin is performed by the heater core 42 heating air and blowing the air into the vehicle cabin. In the air-heating operation, the battery 80 and the cooling target equipment 56 can also be cooled as necessary.

The air-cooling operation, the dehumidifying and air-heating operation, and the air-heating operation are switched by the cycle control device 60 executing a control program. The control program is executed when the automatic switch of the operation panel 70 is turned on (ON) and the automatic control of the vehicle cabin is set.

For example, the control program reads a detection signal of the sensor group and an operation signal of the operation panel 70 described above. In a case where the outside air temperature Tam is equal to or higher than a reference outside air temperature KA (in the present embodiment, 0° C.) and the target blowing temperature TAO is equal to or lower than an air-cooling reference temperature α1, the air-cooling operation is selected.

For example, in a case where the outside air temperature Tam is equal to or higher than the reference outside air temperature KA (in the present embodiment, 0° C.) and the target blowing temperature TAO is equal to or higher than an air-heating reference temperature y, the dehumidifying and air-heating operation is selected.

For example, in a case where the outside air temperature Tam is lower than the reference outside air temperature KA (in the present embodiment, 0° C.) and the target blowing temperature TAO is equal to or higher than the air-heating reference temperature y, the air-heating operation is selected.

The target blowing temperature TAO is calculated by the following formula F1.

$$TAO = Kset \times Tset - Kr \times Tr - Kam \times Tam - Ks \times Ts + C \quad (F1)$$

Tset is a set temperature inside the vehicle cabin that is set by the temperature setting switch. Tr is a temperature inside the vehicle cabin that is detected by an inside air sensor. Tam is a temperature outside the vehicle cabin that is detected by an outside air sensor. Ts is the solar radiation amount that is detected by the solar radiation sensor. Kset, Kr, Kam, and Ks are control gains, and C is a correction constant.

The reference outside air temperature KA is set in such a manner that cooling air in the inside evaporator 18 is effective for performing air-cooling or dehumidification in the space to be air-conditioned.

More specifically, in the present embodiment, in order to suppress frosting of the inside evaporator 18, the evaporation pressure regulating valve 20 maintains the refrigerant evaporation temperature in the inside evaporator 18 at a frosting suppression temperature (in the present embodiment, 1° C.) or higher. Therefore, the inside evaporator 18 cannot cool air to a temperature lower than the frosting suppression temperature.

That is, when the temperature of air flowing into the inside evaporator 18 is lower than the frosting suppression temperature, it is not effective to cool air by the inside evaporator 18. Therefore, the reference outside air temperature KA is set to a value lower than the frosting suppression temperature, and air is not cooled by the inside evaporator 18 when the outside air temperature Tam is lower than the reference outside air temperature KA.

The air-heating operation can be performed in the following three types of operation modes.

(1) Outdoor Unit Single Heating Mode

In an outdoor unit single heating mode, the chiller 19 does not absorb heat from the low-temperature-side heat medium, but the outside heat exchanger 16 absorbs heat from outside air, and the heater core 42 heats air.

(2) Parallel Heating Mode

In a parallel heating mode, the outside heat exchanger 16 absorbs heat from outside air, the chiller 19 absorbs heat from the low-temperature-side heat medium, and the heater core 42 heats air.

(3) Chiller Single Heating Mode

In a chiller single heating mode, the outside heat exchanger 16 does not absorb heat from outside air, but the chiller 19 absorbs heat from the low-temperature-side heat medium, and the heater core 42 heats air.

The outdoor unit single heating mode and the parallel heating mode are an outside air heat absorbing mode in which the outside heat exchanger 16 absorbs heat from outside air. The parallel heating mode and the chiller single heating mode are a waste heat recovery mode in which the chiller 19 absorbs waste heat of at least one of the battery 80 or the cooling target equipment 56.

The control program for switching the outdoor unit single heating mode, the parallel heating mode, and the chiller single heating mode will be described with reference to FIG. 3. Each control step illustrated in the flowchart of FIG. 3 and the like is a function implementation unit included in the cycle control device 60.

Figure 3:
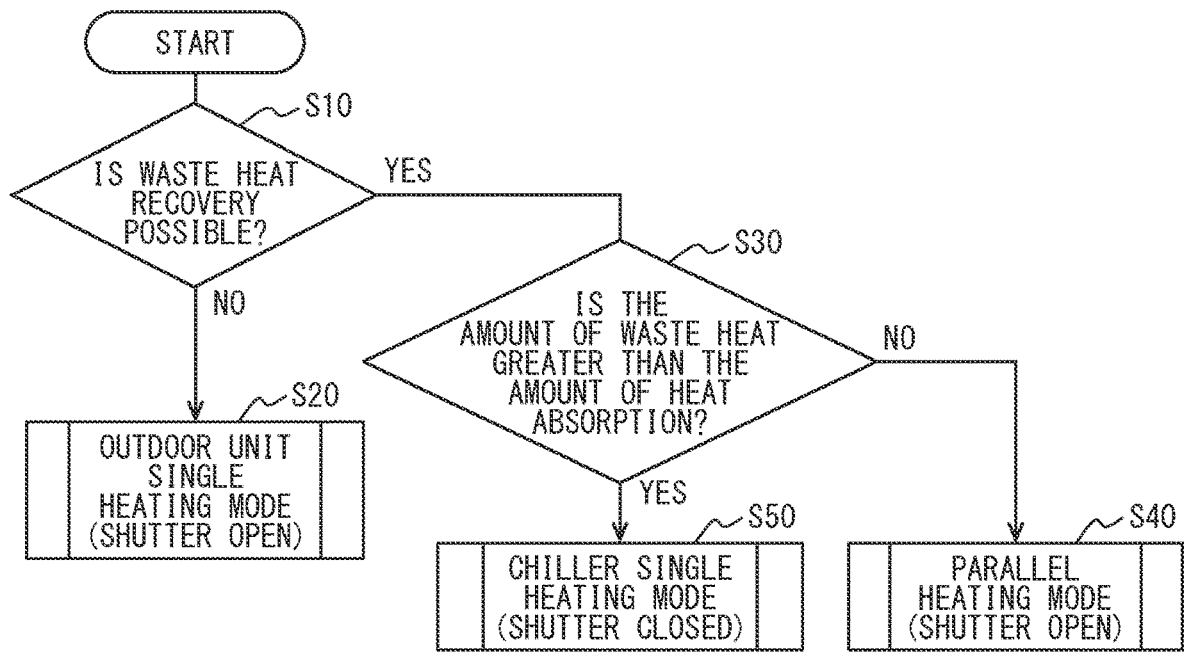
FIG. 3 is a flowchart illustrating a part of processing of controlling a control program in the first embodiment.

First, in step S10 in FIG. 3, it is determined whether or not the chiller 19 can recover waste heat. Specifically, if at least one of the temperature of the battery 80 or the temperature of the cooling target equipment 56 is in a waste heat recoverable region illustrated in FIG. 4, it is determined that the chiller 19 can recover the waste heat.

Figure 4:
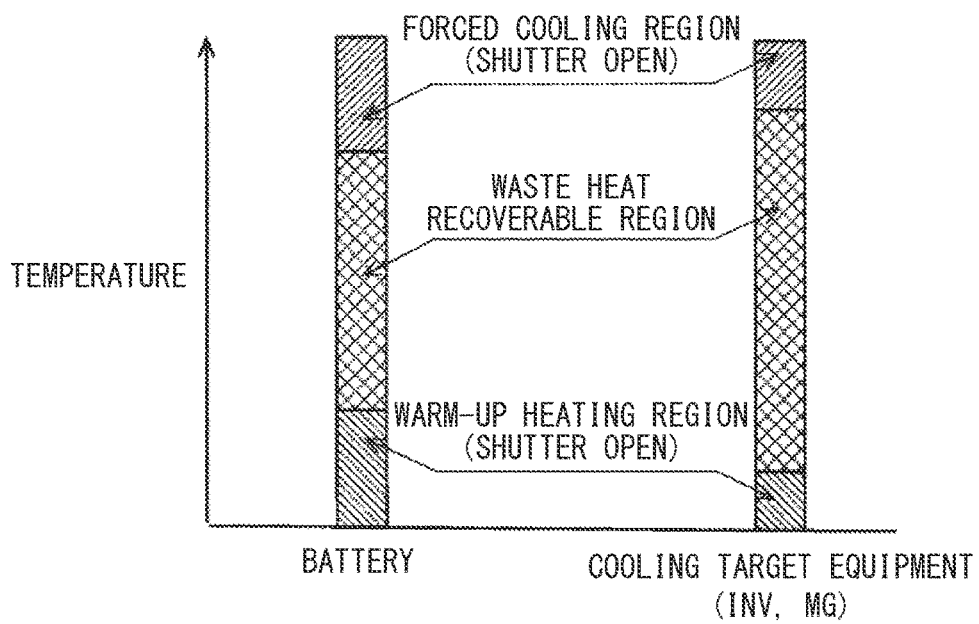
FIG. 4 is a graph showing a temperature region for a battery and a cooling target equipment in the first embodiment.

If both the temperature of the battery 80 and the temperature of the cooling target equipment 56 are in the waste heat recoverable region illustrated in FIG. 4, waste heat is recovered from at least the battery 80. That is, waste heat recovery from the battery 80 is prioritized over waste heat recovery from the cooling target equipment 56. As a result, the temperature of the battery 80 can be appropriately maintained.

In step S10, if the temperature of the low-temperature-side heat medium is equal to or higher than a waste heat recovery temperature, it may be determined that the chiller 19 can recover waste heat. The waste heat recovery temperature is a temperature at a boundary between the waste heat recoverable region and a warm-up heating region in FIG. 4.

If it is determined in step S10 that the chiller 19 cannot recover waste heat, the process proceeds to step S20, and (1) outdoor unit single heating mode is selected as the air-heating mode. If it is determined in step S10 that the chiller 19 can recover waste heat, the process proceeds to step S30, and it is determined whether or not the amount of waste heat is larger than the amount of heat absorbed.

That is, it is determined whether or not the amount of waste heat of the waste heat device that is a target of heat absorption by the refrigerant of the refrigeration cycle device 10 (in the present embodiment, the amount of waste heat of the battery 80 and the cooling target equipment 56) is larger than the amount of heat absorbed by the refrigerant in the entire refrigeration cycle device 10 (in the present embodiment, the amount of heat absorbed by the refrigerant in the outside heat exchanger 16 and the chiller 19).

Specifically, the amount of waste heat of the battery 80 and the cooling target equipment 56 is calculated, the amount of heat absorbed by the refrigerant in the outside heat exchanger 16 and the chiller 19 is calculated, and the calculated amount of waste heat and the calculated amount of heat absorbed are compared.

For example, the amount of waste heat can be calculated using the difference in the temperature of the low-temperature-side heat medium between the inlet ports and the outlet ports of the battery 80 and the cooling target equipment 56 and the flow rate of the low-temperature-side heat medium. The flow rate of the low-temperature-side heat medium may be detected by a flow rate sensor, or may be calculated using outputs of the first low-temperature-side heat medium pump 51 and the second low-temperature-side heat medium pump 55. For example, the amount of waste heat can be calculated by calculating the calorific value using the current values and the electric resistance values of the battery 80 and the cooling target equipment 56, and multiplying the calculated calorific value by the efficiency.

For example, the amount of heat absorbed by the refrigerant in the outside heat exchanger 16 can be calculated using the enthalpy difference between the inlet port and the outlet port of the outside heat exchanger 16 and the flow rate of the refrigerant in the outside heat exchanger 16. The amount of heat absorbed by the refrigerant in the chiller 19 can be calculated using the enthalpy difference between the inlet port and the outlet port of the chiller 19 and the flow rate of the refrigerant in the chiller 19.

For example, the amount of heat absorbed by the refrigerant in the outside heat exchanger 16 and the chiller 19 can be calculated by subtracting the power of the compressor 11 from the air-heating capacity of the vehicle air conditioner 1. The air-heating capacity of the vehicle air conditioner 1 can be calculated using the flow rate of the high-temperature-side heat medium and the temperature of the high-temperature-side heat medium in the heater core 42.

If it is determined in step S30 that the amount of waste heat is not larger than the amount of heat absorbed, the process proceeds to step S40, and the parallel heating mode is selected.

If it is determined in step S30 that the amount of waste heat is larger than the amount of heat absorbed, the process proceeds to step S50, and the chiller single heating mode is selected.

Hereinafter, a detailed operation of the vehicle air conditioner 1 in each operation mode in the air-heating operation will be described. The control map referred to in each operation mode in the following description is stored in a control device in advance for each operation mode.

(1) Outdoor Unit Single Heating Mode

Figure 5:
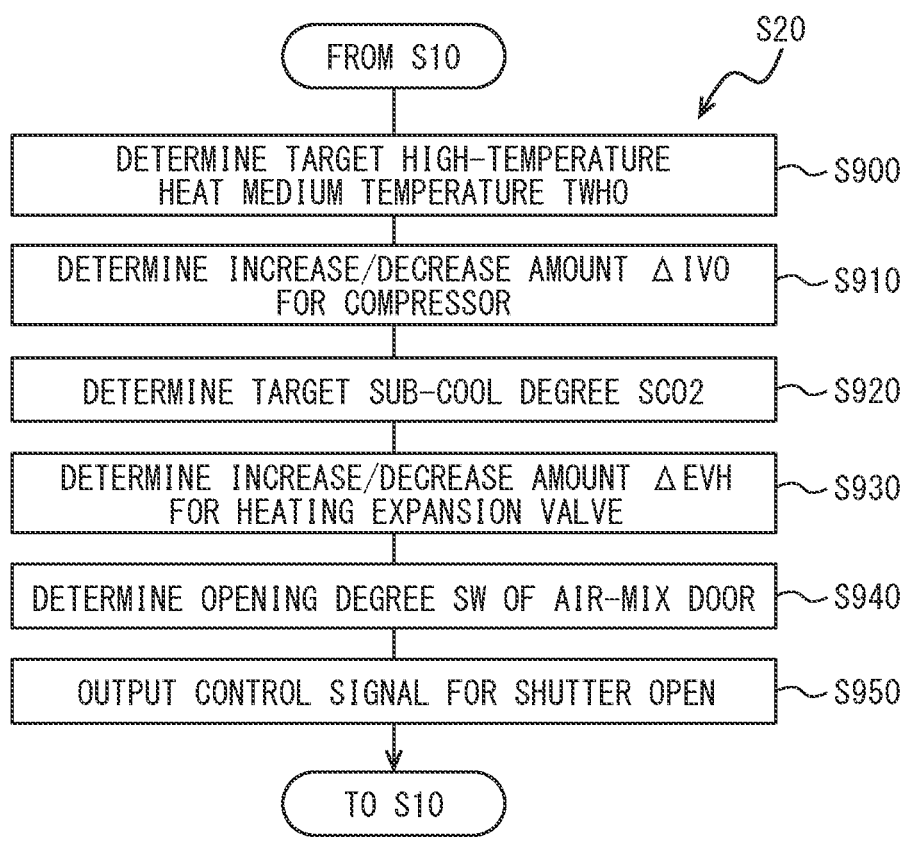
FIG. 5 is a flowchart illustrating control processing in an outdoor unit single heating mode in the first embodiment.

In the outdoor unit single heating mode, the cycle control device 60 performs the control flow of the outdoor unit single heating mode illustrated in FIG. 5. First, in step S900, a target high-temperature-side heat medium temperature TWHO of the high-temperature-side heat medium is determined in such a manner that air can be heated by the heater core 42. The target high-temperature-side heat medium temperature TWHO is determined with reference to a control map on the basis of the target blowing temperature TAO and the efficiency of the heater core 42. In the control map of the present embodiment, the target high-temperature-side heat medium temperature TWHO is determined to increase as the target blowing temperature TAO increases.

In step S910, an increase/decrease amount $\Delta$IVO of the rotation speed of the compressor 11 is determined. In the outdoor unit single heating mode, the increase/decrease amount $\Delta$IVO is determined by a feedback control method on the basis of the deviation between the target high-temperature-side heat medium temperature TWHO and the high-temperature-side heat medium temperature TWH in such a manner that the high-temperature-side heat medium temperature TWH approaches the target high-temperature-side heat medium temperature TWHO.

In step S920, a target degree of subcooling SCO2 of the refrigerant flowing out of the refrigerant passage of the water-refrigerant heat exchanger 12 is determined. The target degree of subcooling SCO2 is determined with reference to the control map on the basis of the suction temperature of air flowing into the inside evaporator 18 or the outside air temperature Tam. In the control map of the present embodiment, the target degree of subcooling SCO2 is determined in such a manner that the coefficient of performance (COP) of the cycle approaches the maximum value.

In step S930, an increase/decrease amount $\Delta$EVH of the throttle opening of the air-heating expansion valve 14a is determined. The increase/decrease amount $\Delta$EVH is determined by the feedback control method on the basis of the deviation between the target degree of subcooling SCO2 and the degree of subcooling SC2 of the refrigerant flowing out of the refrigerant passage of the water-refrigerant heat exchanger 12 in such a manner that the degree of subcooling SC2 of the refrigerant flowing out of the refrigerant passage of the water-refrigerant heat exchanger 12 approaches the target degree of subcooling SCO2.

The degree of subcooling SC2 of the refrigerant flowing out of the refrigerant passage of the water-refrigerant heat exchanger 12 is calculated on the basis of the temperature T2 detected by the second refrigerant temperature sensor 64b and the pressure P1 detected by the first refrigerant pressure sensor 65a.

In step S940, the opening SW of the air mix door 34 is calculated using the following formula F2.

$$SW=\{TAO+(Tefin+C2)\}/\{TWH+(Tefin+C2)\} \quad (F2)$$

TWH is a high-temperature-side heat medium temperature detected by the high-temperature-side heat medium temperature sensor 66a. C2 is a control constant. In the outdoor unit single heating mode, the target blowing temperature TAO increases, and thus the opening SW of the air mix door 34 approaches 100%. Therefore, in the outdoor unit single heating mode, the opening of the air mix door 34 is determined in such a manner that substantially the entire flow rate of air after passing through the inside evaporator 18 passes through the heater core 42.

In step S950, in order to switch the refrigeration cycle device 10 to the refrigerant circuit in the air-heating mode, the air-heating expansion valve 14a is throttled, the air-cooling expansion valve 14b is fully closed, the chiller expansion valve 14c is fully closed, the dehumidifying on-off valve 15a is closed, the air-heating on-off valve 15b is opened, and the shutter 90 is opened. As a result, heat is absorbed from outside air in the outside heat exchanger 16. Furthermore, a control signal or a control voltage is output to each control target device in such a manner that the control states determined in steps S910, S930, and S940 are obtained, and the process returns to step S10.

Figure 6:
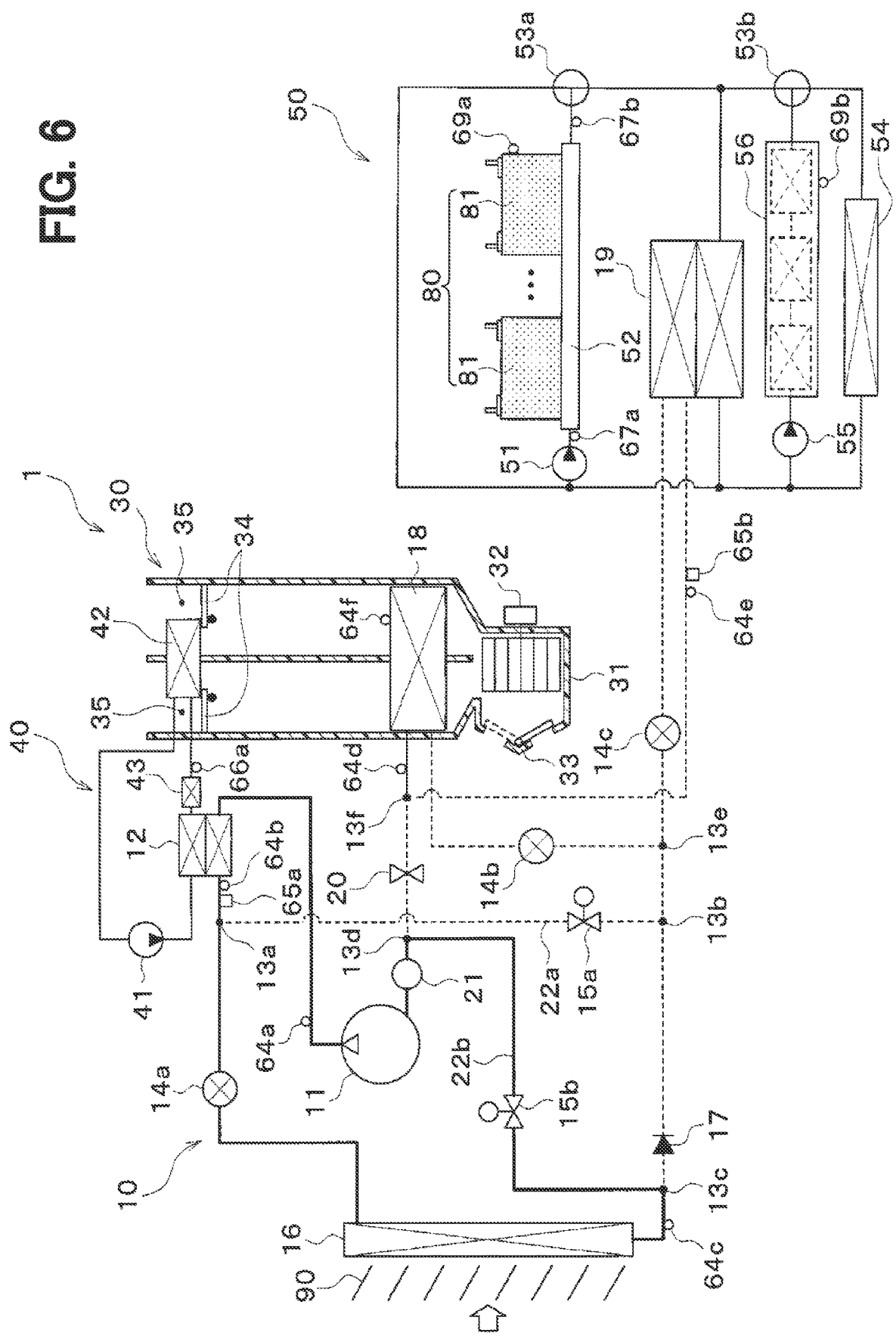
FIG. 6 is an overall configuration diagram of the vehicle air conditioner according to the first embodiment, and illustrates a flow of a refrigerant in the outdoor unit single heating mode.

Therefore, as indicated by a thick solid line in FIG. 6, in the refrigeration cycle device 10 in the outdoor unit single heating mode, a vapor compression refrigeration cycle is configured in which the refrigerant circulates in the order of the compressor 11, the water-refrigerant heat exchanger 12, the air-heating expansion valve 14*a*, the outside heat exchanger 16, the air-heating passage 22*b*, the accumulator 21, and the compressor 11.

That is, in the refrigeration cycle device 10 in the outdoor unit single heating mode, the refrigeration cycle is configured in such a manner that the water-refrigerant heat exchanger 12 functions as a radiator that radiates heat from the refrigerant discharged from the compressor 11, the air-heating expansion valve 14*a* functions as a decompression unit, and the outside heat exchanger 16 functions as an evaporator.

With this configuration, the outside heat exchanger 16 can absorb heat from outside air, and the water-refrigerant heat exchanger 12 can heat the high-temperature-side heat medium. In the vehicle air conditioner 1 in the air-heating mode, air-heating in the vehicle cabin can be performed by blowing air heated by the heater core 42 into the vehicle cabin.

(2) Parallel Heating Mode

Figure 7:
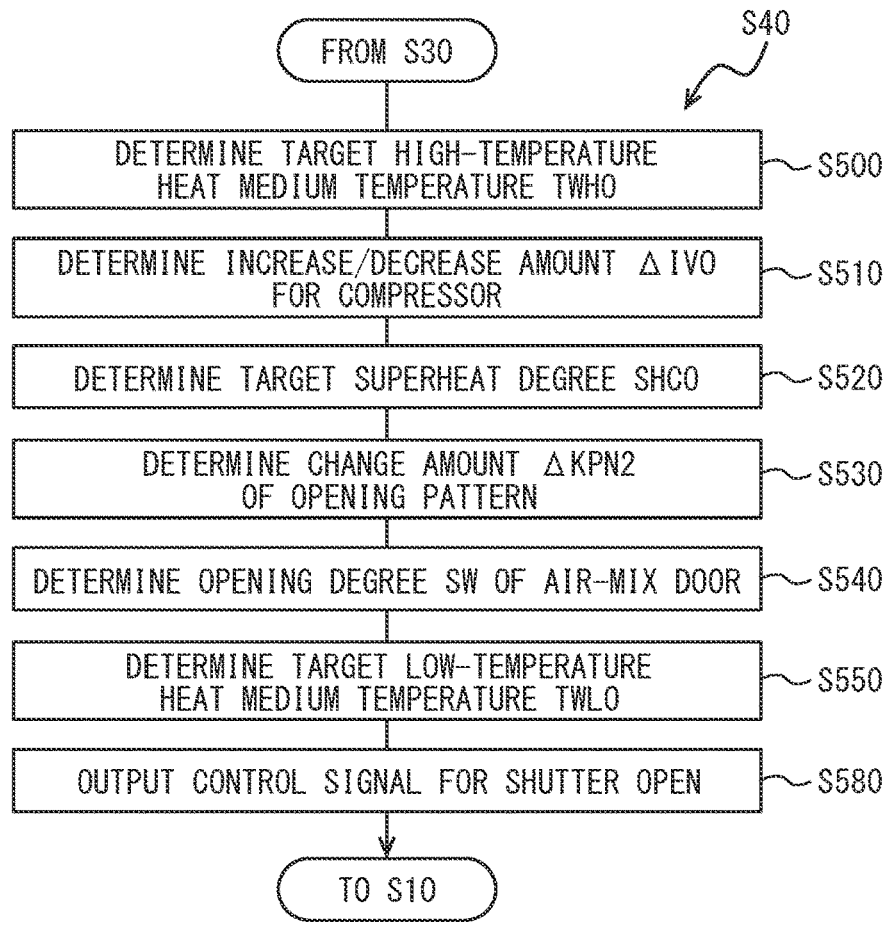
FIG. 7 is a flowchart illustrating control processing in a parallel heating mode in the first embodiment.

In the parallel heating mode, the cycle control device 60 performs the control flow of the parallel heating mode illustrated in FIG. 7. First, in step S500, the target high-temperature-side heat medium temperature TWHO of the high-temperature-side heat medium is determined in such a manner that air can be heated by the heater core 42, as in the outdoor unit single heating mode.

In step S510, the increase/decrease amount ΔIVO of the rotation speed of the compressor 11 is determined. In the air-heating parallel cooling mode, the increase/decrease amount ΔIVO is determined by the feedback control method on the basis of the deviation between the target high-temperature-side heat medium temperature TWHO and the high-temperature-side heat medium temperature TWH in such a manner that the high-temperature-side heat medium temperature TWH approaches the target high-temperature-side heat medium temperature TWHO, as in the outdoor unit single heating mode.

In step S520, a target degree of superheat SHCO of the refrigerant on the outlet port side of the refrigerant passage in the chiller 19 is determined. As the target degree of superheat SHCO, a predetermined constant (in the present embodiment, 5° C.) can be used.

In step S530, a change amount ΔKPN2 of an opening pattern KPN2 is determined. The opening pattern KPN2 is a parameter for determining a combination of the throttle opening of the air-heating expansion valve 14*a* and the throttle opening of the chiller expansion valve 14*c*.

In the air-heating parallel cooling mode, the degree of superheat SHC is determined to approach the target degree of superheat SHCO by the feedback control method on the basis of the deviation between the target degree of superheat SHCO and the degree of superheat SHC of the refrigerant on the outlet port side of the refrigerant passage in the chiller 19.

Figure 8:
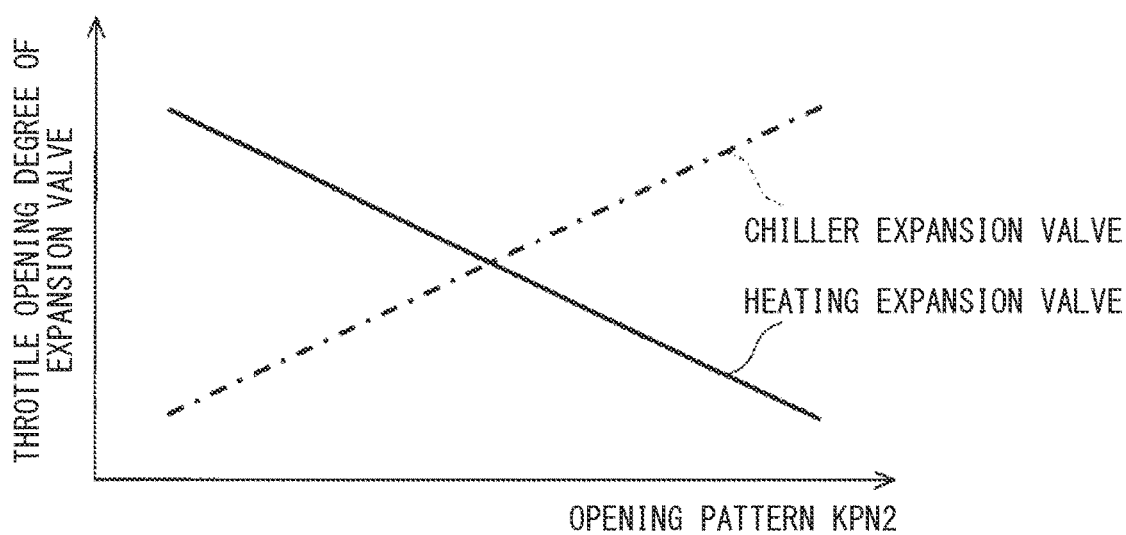
FIG. 8 is a control characteristic diagram illustrating an expansion valve opening pattern in the parallel heating mode in the first embodiment.

Specifically, as illustrated in FIG. 8, the opening pattern KPN2 increases as the target blowing temperature TAO increases. As the opening pattern KPN2 increases, the throttle opening of the air-heating expansion valve 14*a* decreases and the throttle opening of the chiller expansion valve 14*c* increases.

Therefore, when the opening pattern KPN2 increases, the flow rate of the refrigerant flowing into the refrigerant passage of the chiller 19 increases, and the degree of superheat SHC of the refrigerant on the outlet port side of the refrigerant passage in the chiller 19 decreases.

In step S540, the opening SW of the air mix door 34 is calculated as in the outdoor unit single heating mode, and the process proceeds to step S580.

In step S580, in order to switch the refrigeration cycle device 10 to the refrigerant circuit in the parallel heating mode, the air-heating expansion valve 14*a* is throttled, the air-cooling expansion valve 14*b* is fully closed, the chiller expansion valve 14*c* is throttled, the dehumidifying on-off valve 15*a* is opened, the air-heating on-off valve 15*b* is opened, and the shutter 90 is opened. Furthermore, a control signal or a control voltage is output to each control target device in such a manner that the control states determined in steps S510, S530, and S540 are obtained, and the process returns to step S10.

Figure 9:
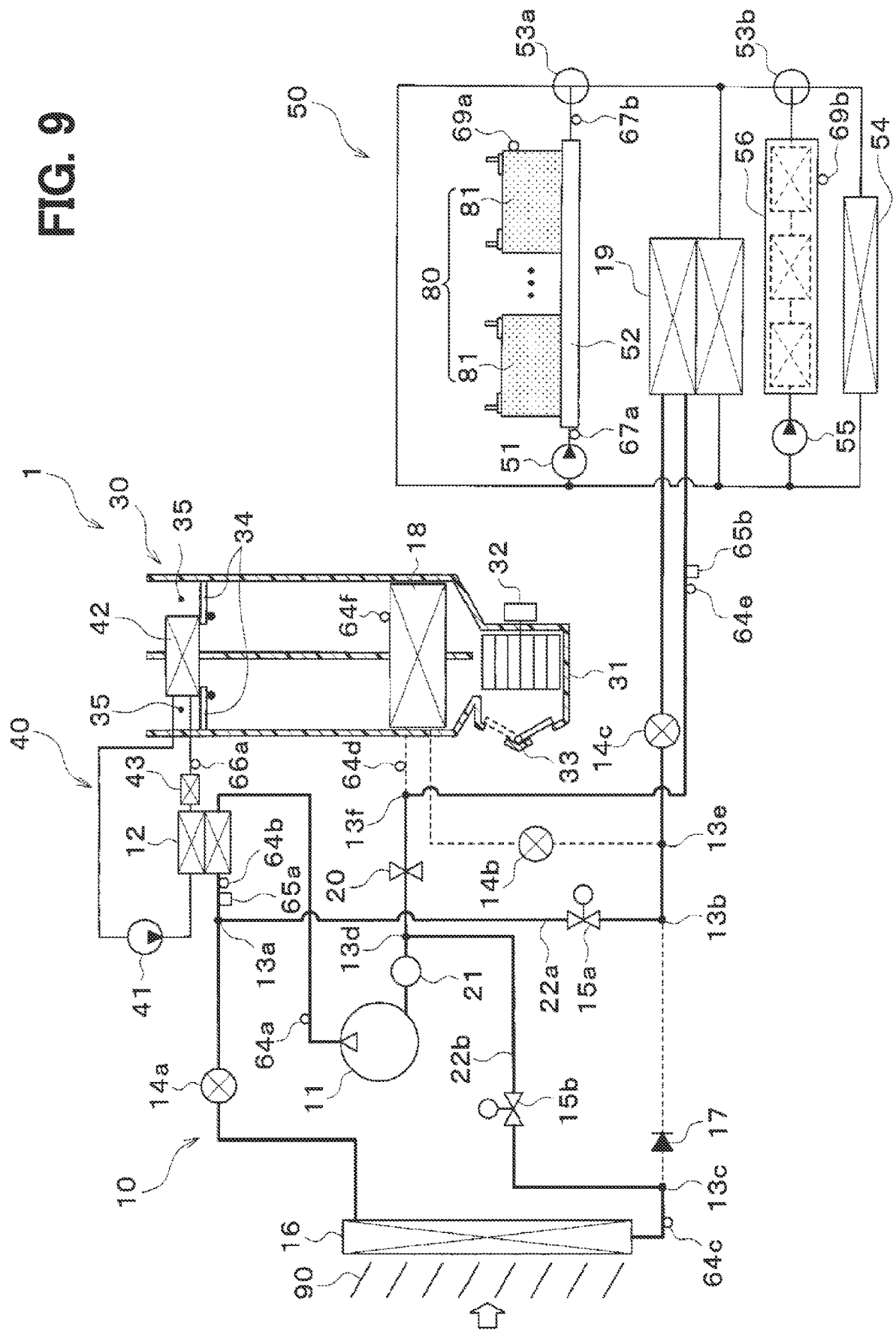
FIG. 9 is an overall configuration diagram of the vehicle air conditioner according to the first embodiment, and illustrates a flow of a refrigerant in the parallel heating mode.

Therefore, as indicated by a thick solid line in FIG. 9, in the refrigeration cycle device 10 in the parallel heating mode, a vapor compression refrigeration cycle is configured in which the refrigerant circulates in the order of the compressor 11, the water-refrigerant heat exchanger 12, the air-heating expansion valve 14*a*, the outside heat exchanger 16, the air-heating passage 22*b*, the accumulator 21, and the compressor 11. Furthermore, in the refrigeration cycle device 10 in the parallel heating mode, a vapor compression refrigerant circuit is configured in which the refrigerant circulates in the order of the compressor 11, the water-refrigerant heat exchanger 12, the bypass passage 22*a*, the chiller expansion valve 14*c*, the chiller 19, the evaporation pressure regulating valve 20, the accumulator 21, and the compressor 11.

That is, in the refrigeration cycle device 10 in the parallel heating mode, the refrigeration cycle is configured in such a manner that the water-refrigerant heat exchanger 12 functions as a radiator that radiates heat from the refrigerant discharged from the compressor 11, the air-heating expansion valve 14*a* functions as a decompression unit, the outside heat exchanger 16 functions as an evaporator, the chiller expansion valve 14*c* connected in parallel with the air-heating expansion valve 14*a* and the outside heat exchanger 16 functions as a decompression unit, and the chiller 19 functions as an evaporator.

With this configuration, the outside heat exchanger 16 can absorb heat from outside air, the chiller 19 can absorb heat from the low-temperature-side heat medium, and the water-refrigerant heat exchanger 12 can heat the high-temperature-side heat medium.

In the vehicle air conditioner 1 in the parallel heating mode, air-heating in the vehicle cabin can be performed by blowing air heated by the heater core 42 into the vehicle cabin.

In the parallel heating mode, the amount of heat radiated from the refrigerant in the water-refrigerant heat exchanger 12 to the high-temperature-side heat medium can be increased by increasing the opening pattern KPN2 with the increase in the target blowing temperature TAO. As a result, in the parallel heating mode, the capability to heat air in the heater core 42 can be improved with the increase in the target blowing temperature TAO.

(3) Chiller Single Heating Mode

Figure 10:
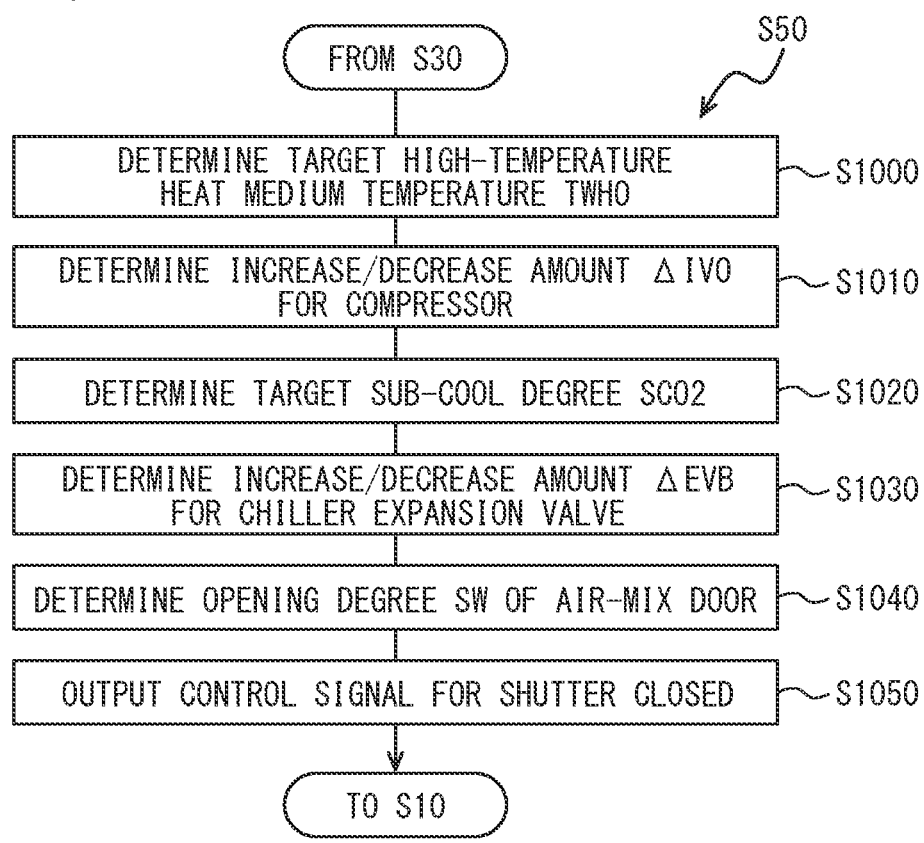
FIG. 10 is a flowchart illustrating control processing in an chiller single heating mode in the first embodiment.

In the cooling mode, the cycle control device 60 performs the control flow of the chiller single heating mode illustrated in FIG. 10. First, in steps S1000 to S1020, as in steps S900 to S920 in the outdoor unit single heating mode, the target high-temperature-side heat medium temperature TWHO of the high-temperature-side heat medium, the increase/decrease amount ΔIVO of the rotation speed of the compressor 11, and the target degree of subcooling SCO2 are determined.

In step S1030, an increase/decrease amount ΔEVB of the throttle opening of the chiller expansion valve 14c is determined. The increase/decrease amount ΔEVB is determined by the feedback control method on the basis of the deviation between the target degree of subcooling SCO2 and the degree of subcooling SC2 of the refrigerant flowing out of the refrigerant passage of the water-refrigerant heat exchanger 12 in such a manner that the degree of subcooling SC2 of the refrigerant flowing out of the refrigerant passage of the water-refrigerant heat exchanger 12 approaches the target degree of subcooling SCO2.

In step S1040, the opening SW of the air mix door 34 is calculated as in step S940 in the outdoor unit single heating mode, and the process proceeds to step S1050.

In step S1050, in order to switch the refrigeration cycle device 10 to the refrigerant circuit in the chiller single heating mode, the air-heating expansion valve 14a is fully closed, the air-cooling expansion valve 14b is fully closed, the chiller expansion valve 14c is throttled, the dehumidifying on-off valve 15a is opened, the air-heating on-off valve 15b is closed, and the shutter 90 is closed. Furthermore, a control signal or a control voltage is output to each control target device in such a manner that the control states determined in steps S1010, S1030, and S1040 are obtained, and the process returns to step S10.

Figure 11:
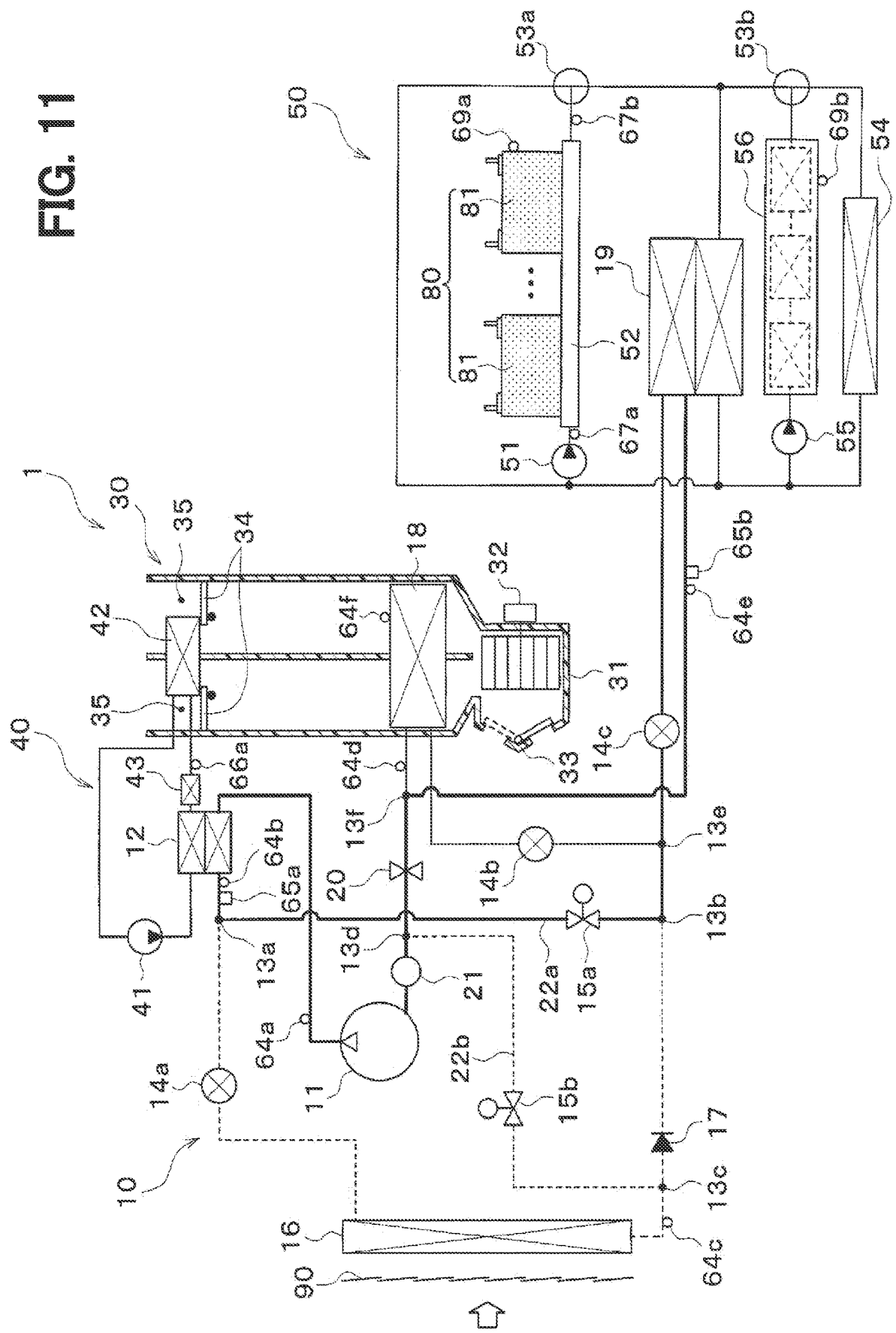
FIG. 11 is an overall configuration diagram of the vehicle air conditioner according to the first embodiment, and illustrates a flow of a refrigerant in the chiller single heating mode.

Therefore, in the refrigeration cycle device 10 in the chiller single heating mode, as indicated by a thick solid line in FIG. 11, a vapor compression refrigerant circuit is configured in which the refrigerant circulates in the order of the compressor 11, the water-refrigerant heat exchanger 12, the bypass passage 22a, the chiller expansion valve 14c, the chiller 19, the evaporation pressure regulating valve 20, the accumulator 21, and the compressor 11.

That is, in the refrigeration cycle device 10 in the chiller single heating mode, a vapor compression refrigeration cycle is configured in which the water-refrigerant heat exchanger 12 functions as a radiator that radiates heat from the refrigerant discharged from the compressor 11, the chiller expansion valve 14c functions as a decompression unit, and the chiller 19 functions as an evaporator.

With this configuration, the chiller 19 can absorb heat from the low-temperature-side heat medium, and the water-refrigerant heat exchanger 12 can heat the high-temperature-side heat medium. In the vehicle air conditioner 1 in the chiller single heating mode, air-heating in the vehicle cabin can be performed by blowing air heated by the heater core 42 into the vehicle cabin. Since the shutter 90 is closed, the air resistance of the vehicle can be suppressed.

The cycle control device 60 not only controls the shutter 90 in accordance with the outdoor unit single heating mode, the parallel heating mode, and the chiller single heating mode, but also controls the shutter 90 as follows.

The cycle control device 60 opens the shutter 90 in a case where at least one of the temperature of the battery 80 or the temperature of the cooling target equipment 56 is in a forced cooling region illustrated in FIG. 4. In other words, the cycle control device 60 opens the shutter 90 in a case where at least one of the temperature of the battery 80 or the temperature of the cooling target equipment 56 is equal to or higher than a forced cooling temperature. The forced cooling temperature is a temperature at a boundary between the waste heat recoverable region and the forced cooling region in FIG. 4. As a result, the low-temperature-side radiator 54 can radiate heat from the low-temperature-side heat medium to outside air to lower the temperature of the low-temperature-side heat medium. Therefore, the temperature of the battery 80 and the temperature of the cooling target equipment 56 can be set in the waste heat recoverable region illustrated in FIG. 4.

In a case where at least one of the temperature of the battery 80 or the temperature of the cooling target equipment 56 is in the warm-up heating region illustrated in FIG. 4, the cycle control device 60 opens the shutter 90, thereby causing the low-temperature-side heat medium to absorb heat from outside air in the low-temperature-side radiator 54 and increasing the temperature of the low-temperature-side heat medium.

In other words, in a case where at least one of the temperature of the battery 80 or the temperature of the cooling target equipment 56 is equal to or lower than the waste heat recovery temperature, the cycle control device 60 opens the shutter 90, thereby causing the low-temperature-side heat medium to absorb heat from outside air in the low-temperature-side radiator 54 and increasing the temperature of the low-temperature-side heat medium. The waste heat recovery temperature is a temperature at the boundary between the waste heat recoverable region and the warm-up heating region in FIG. 4. Therefore, the temperature of the battery 80 and the temperature of the cooling target equipment 56 can be set in the waste heat recoverable region illustrated in FIG. 4.

In a case where the temperature of the battery 80 is in the waste heat recoverable region and the amount of waste heat of the battery 80 is larger than the amount of heat absorbed from outside air in the low-temperature-side radiator 54, heat can be absorbed from the battery 80, and thus the shutter 90 can be closed. At that time, the cooling target equipment 56 may be in the warm-up heating region.

In a case where the temperature of the cooling target equipment 56 is in the waste heat recoverable region and the amount of waste heat of the cooling target equipment 56 is larger than the amount of heat absorbed from outside air in the low-temperature-side radiator 54, heat can be absorbed from the cooling target equipment 56, and thus the shutter 90 can be closed. At that time, the battery 80 may be in the warm-up heating region.

The cycle control device 60 closes the shutter 90 at a high vehicle speed at which the travel resistance of the vehicle increases and the amount of waste heat of the cooling target equipment 56 increases. In other words, the cycle control device 60 closes the shutter 90 in a case where the travel speed of the vehicle exceeds a predetermined speed. As a result, it is possible to effectively reduce the travel resistance of the vehicle and achieve energy saving of the vehicle while effectively using the amount of waste heat of the cooling target equipment 56 for air-heating.

The cycle control device 60 may close the shutter 90 when the travel load of the vehicle increases and the amount of waste heat of the cooling target equipment 56 increases. In other words, the cycle control device 60 may close the shutter 90 in a case where the travel load of the vehicle exceeds a predetermined load. As a result, it is possible to effectively reduce the travel resistance of the vehicle and achieve energy saving of the vehicle while effectively using the amount of waste heat of the cooling target equipment 56 for air-heating.

Figure 12:
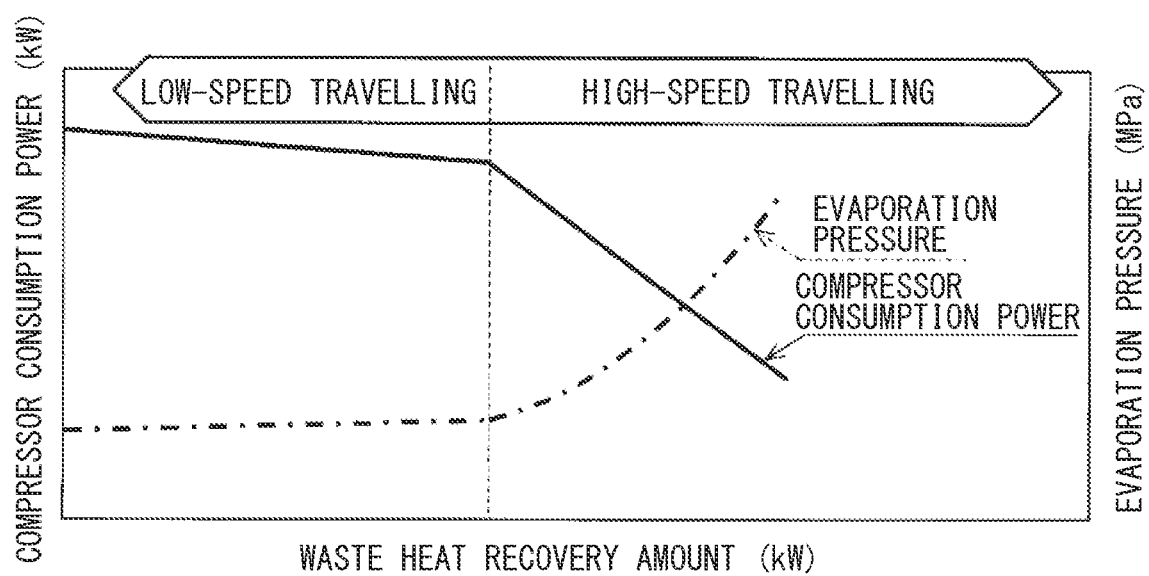
FIG. 12 is a graph showing a relationship between a recovery amount of waste heat in the refrigeration cycle device, power consumption of a compressor, and an evaporation pressure of the refrigeration cycle device in the first embodiment.

FIG. 12 is a graph showing a relationship between a recovery amount of waste heat of the refrigeration cycle device 10, power consumption of the compressor 11, and an evaporation pressure of the refrigeration cycle device 10, and shows a verification result under the conditions of an outside air temperature of −7° C., an outside air wind speed of 2 m/s, an inside air temperature of 9° C., an inside volume of 250 m3/h, and an air-heating capacity of 3.58 kW.

The amount of waste heat of the cooling target equipment 56 such as an inverter or a motor generator increases due to high-speed traveling. When the amount of waste heat increases and the recovery amount of waste heat also increases, the evaporation pressure of the refrigeration cycle device 10 increases, and thus the power consumption of the compressor 11 decreases. Therefore, energy saving can be achieved.

Figure 13:
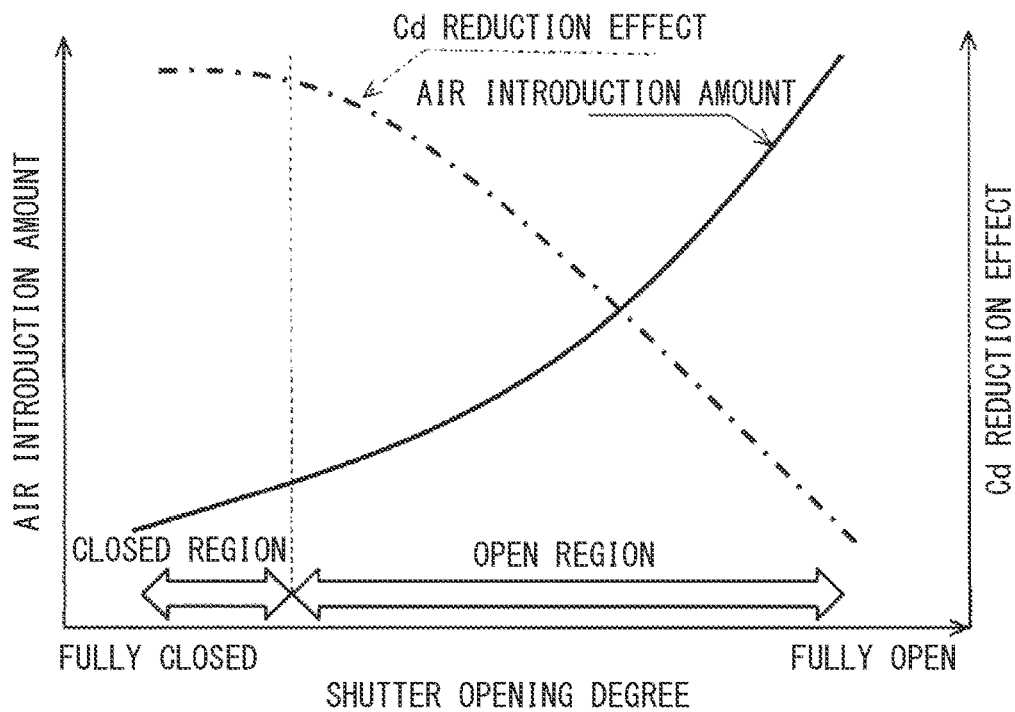
FIG. 13 is a graph showing a relationship between a shutter opening, an amount of air guided to an outside heat exchanger, and an air resistance value of a vehicle in the first embodiment.

As shown in FIG. 13, as the opening of the shutter 90 decreases, the amount of air guided to the outside heat exchanger 16 decreases, but the air resistance value (so-called Cd value) of the vehicle decreases. In the present embodiment, since it is not necessary to introduce outside air into the outside heat exchanger 16 in the chiller single heating mode, the shutter 90 is closed. Since the air resistance of the vehicle can be reduced in the chiller single heating mode, energy saving can be achieved.

In the present embodiment, as described in steps S30, S50, and the like, the cycle control device 60 closes the shutter 90 in a case where it is determined that the amount of waste heat of the battery 80 and the cooling target equipment 56 is larger than the amount of heat absorbed from the refrigerant in the outside heat exchanger 16 and the chiller 19.

Accordingly, not only the chiller 19 absorbs heat from the cooling target equipment 56, but also the outside heat exchanger 16 absorbs heat from outside air and performs air-heating. As a result, energy saving of air-heating can be achieved. Furthermore, in a case where the outside heat exchanger 16 does not need to absorb heat from outside air for air-heating, the shutter 90 is closed, so that the travel resistance of the vehicle can be reduced and energy saving of the vehicle can be achieved.

In the present embodiment, as described in step S1050 and the like, the cycle control device 60 closes the shutter 90 in a case where the flow of the refrigerant to the outside heat exchanger 16 is blocked. Accordingly, in a case where the outside heat exchanger 16 does not absorb heat from outside air, the shutter 90 is closed, so that the travel resistance of the vehicle can be reduced and energy saving of the vehicle can be achieved.

In the present embodiment, the cycle control device 60 opens the shutter 90 in a case where the temperature of the low-temperature-side heat medium is equal to or higher than the forced cooling temperature. Accordingly, since the low-temperature-side heat medium can be forcibly cooled by the low-temperature-side radiator 54, it is possible to suppress the temperature of the low-temperature-side heat medium from being excessively increased.

In the present embodiment, the cycle control device 60 shifts to the waste heat recovery mode in which the chiller 19 absorbs waste heat of at least one of the battery 80 or the cooling target equipment 56 in a case where the temperature of the low-temperature-side heat medium is equal to or higher than the waste heat recovery temperature, and closes the shutter in a case where it is determined that the amount of waste heat of the battery 80 and the cooling target equipment 56 is larger than the amount of heat absorbed by the outside heat exchanger 16 in the waste heat recovery mode.

As a result, it is possible to effectively use the waste heat of the battery 80 and the cooling target equipment 56 for air-heating, and thus energy saving can be effectively achieved.

In the present embodiment, the cycle control device 60 closes the shutter in a case where the travel load of the vehicle exceeds a predetermined load (that is, the amount of waste heat of the battery 80 and the cooling target equipment 56 increases). Accordingly, it is possible to effectively reduce the travel resistance of the vehicle and achieve energy saving of the vehicle while effectively using the amount of waste heat of the battery 80 and the cooling target equipment 56 for air-heating.

While the present embodiment has described the opening and closing operation of the shutter 90 in the air-heating operation, such an opening and closing operation of the shutter 90 can be similarly applied to the dehumidifying and air-heating mode.

Second Embodiment

In step S30 of the first embodiment, it is determined whether or not the amount of waste heat is larger than the amount of heat absorbed by comparing the calculated amount of waste heat with the calculated amount of heat absorbed. In step S30 of the present embodiment, it is determined whether or not the amount of waste heat is larger than the amount of heat absorbed on the basis of the operation state of the refrigeration cycle device 10.

Figure 14:
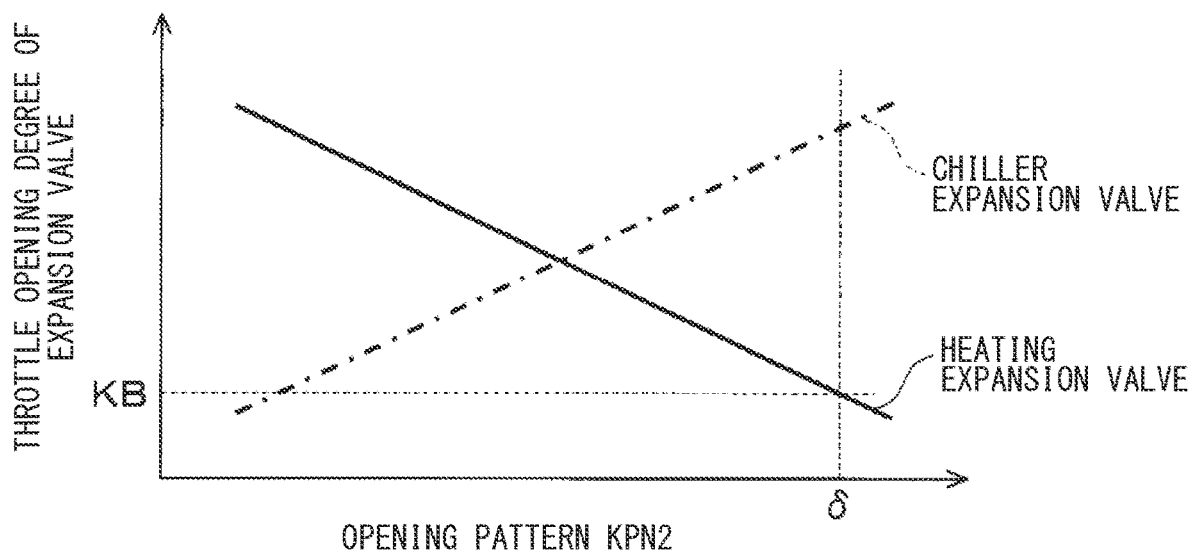
FIG. 14 is a control characteristic diagram illustrating an expansion valve opening pattern and a predetermined opening of a cooling expansion valve in a parallel heating mode in a second embodiment.

Specifically, in a case where the opening of the air-heating expansion valve 14a is equal to or smaller than a predetermined opening KB, it is determined that the amount of waste heat is larger than the amount of heat absorbed. For example, as illustrated in FIG. 14, in a case where the opening pattern KPN2 is equal to or larger than a threshold δ, the opening of the air-heating expansion valve 14a is equal to or smaller than predetermined opening KB, so that it is determined that the amount of waste heat is larger than the amount of heat absorbed.

Also in the present embodiment, effects similar to those of the first embodiment can be obtained.

Third Embodiment

Figure 15:
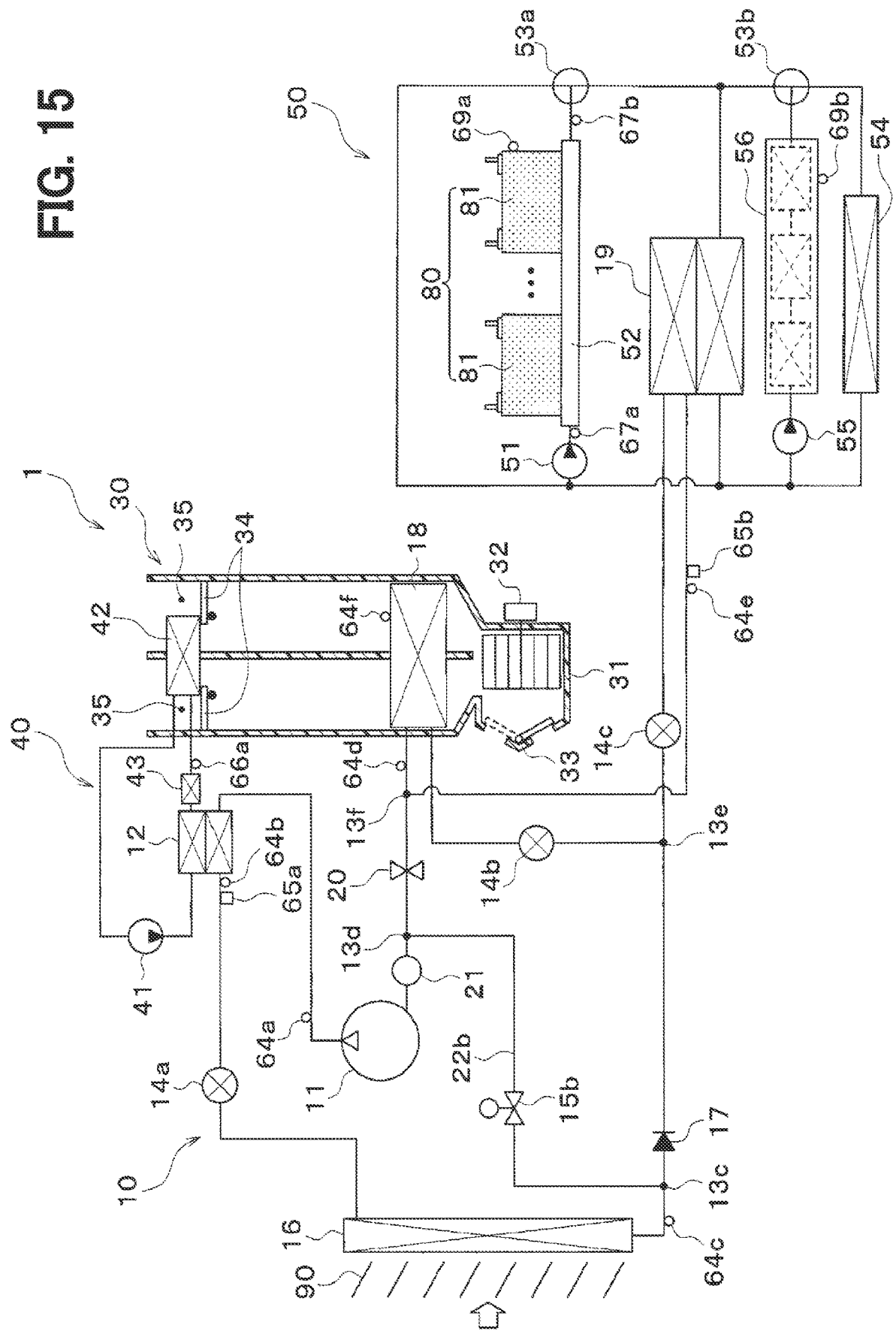
FIG. 15 is an overall configuration diagram of a vehicle air conditioner according to a third embodiment.

In the present embodiment, as illustrated in FIG. 15, the bypass passage 22a is eliminated from the first embodiment. Therefore, there is no (2) parallel heating mode in the present embodiment. In (3) chiller single heating mode, the air-heating expansion valve 14a is controlled such a manner that the refrigerant temperature in the outside heat exchanger 16 is equal to the outside air temperature. As a result, in the chiller single heating mode, absorption of heat by the outside heat exchanger 16 is stopped, and the heat is absorbed by the chiller 19.

Whether the outside heat exchanger 16 functions as a radiator or a heat absorber during the air-heating operation or the dehumidifying and air-heating operation is determined on the basis of a refrigerant temperature, a refrigerant pressure, an outside air temperature, and the like. For example, in a case where the refrigerant temperature in the outside heat exchanger 16 is higher than the outside air temperature, it is determined that the outside heat exchanger 16 functions as a radiator, and in a case where the refrigerant temperature in the outside heat exchanger 16 is lower than the outside air temperature, it is determined that the outside heat exchanger 16 functions as a heat absorber. The refrigerant temperature in the outside heat exchanger 16 may be detected by a refrigerant temperature sensor or may be calculated from the refrigerant pressure in the outside heat exchanger 16.

In the case where the outside heat exchanger 16 functions as a heat absorber, if the amount of waste heat of the battery 80 and the cooling target equipment 56 is larger than the amount of heat absorbed by the outside heat exchanger 16, (3) chiller single heating mode is selected, as in the above embodiment. At that time, since the shutter 90 is closed, the air resistance of the vehicle can be reduced and energy saving of the vehicle can be achieved.

That is, in the present embodiment, the cycle control device 60 determines whether or not the outside heat exchanger 16 absorbs heat on the basis of the physical quantity caused by the temperature of the refrigerant in the outside heat exchanger 16 and the outside air temperature. In a case where it is determined that the outside heat exchanger 16 absorbs heat, it is determined whether or not the amount of waste heat of the battery 80 and the cooling target equipment 56 is larger than the amount of heat absorbed by the chiller 19. In a case where it is determined that the amount of waste heat of the battery 80 and the cooling target equipment 56 is larger than the amount of heat absorbed by the chiller 19, the shutter 90 is closed.

As a result, in a case where the outside heat exchanger 16 does not need to absorb heat from outside air for air-heating, the shutter 90 is closed, so that the travel resistance of the vehicle can be reduced and energy saving of the vehicle can be achieved.

Fourth Embodiment

Figure 16:
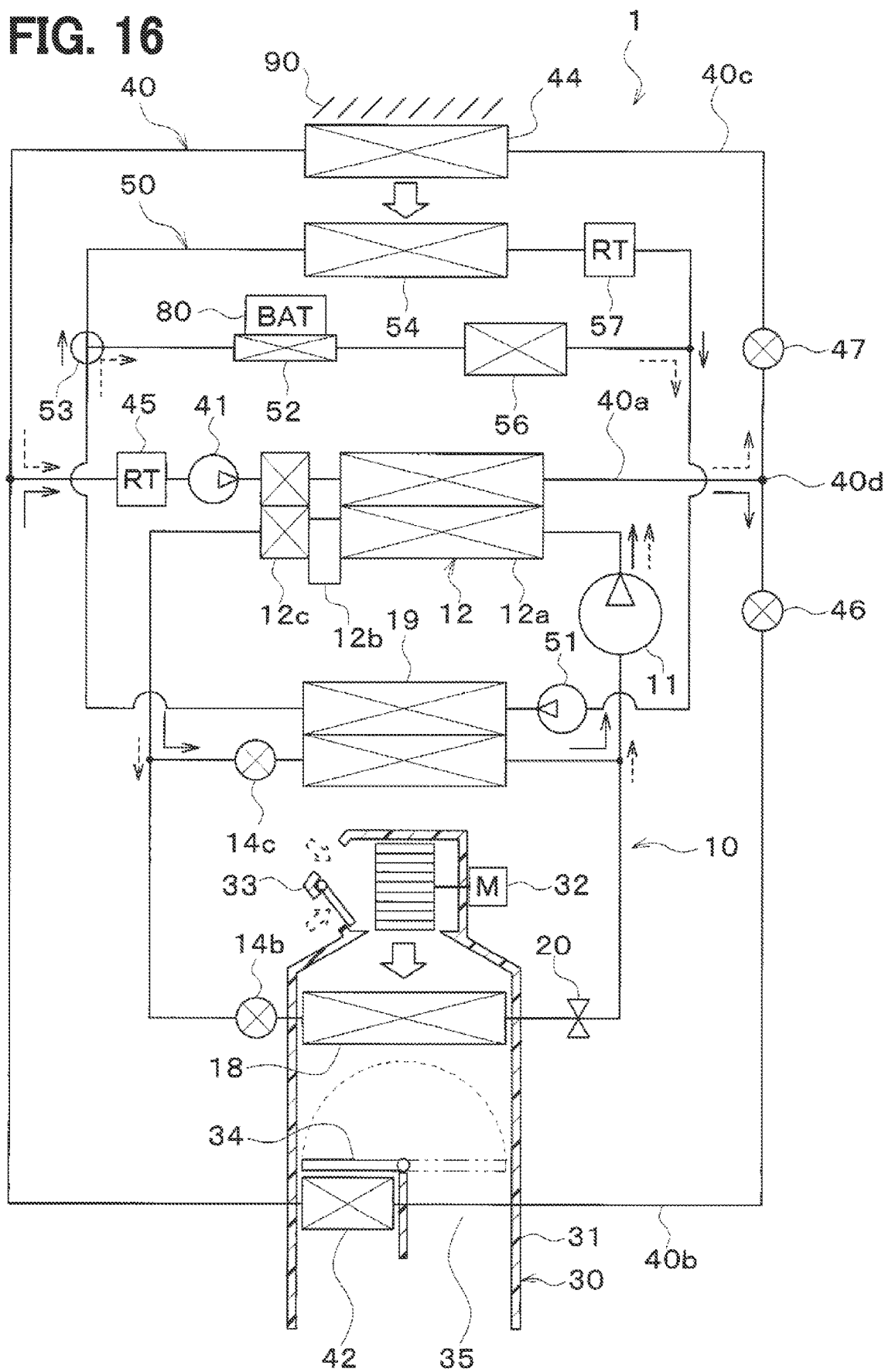
FIG. 16 is an overall configuration diagram of a vehicle air conditioner according to a fourth embodiment.

In the above embodiments, the outside heat exchanger 16 causes the refrigerant to absorb heat from outside air in the air-heating and cooling mode. In the present embodiment, as illustrated in FIG. 16, the outside heat exchanger 16 causes the refrigerant to absorb heat from outside air in the air-heating and cooling mode. However, the low-temperature-side radiator 54, the low-temperature-side heat medium circuit 50, and the chiller 19 cause the refrigerant to absorb heat from outside air via the low-temperature-side heat medium. The low-temperature-side radiator 54, the low-temperature-side heat medium circuit 50, and the chiller 19 of the present embodiment are outside air heat absorbing units that cause the refrigerant to absorb heat from outside air.

The battery 80 and the cooling target equipment 56 are also disposed in the low-temperature-side heat medium circuit 50. Therefore, the low-temperature-side radiator 54, the low-temperature-side heat medium circuit 50, and the chiller 19 are heat absorbing units that cause the refrigerant to absorb heat from outside air and cause the refrigerant to absorb waste heat of the battery 80 and the cooling target equipment 56.

The refrigeration cycle device 10 of the present embodiment is a vapor compression subcritical refrigeration cycle including the compressor 11, the water-refrigerant heat exchanger 12, the air-cooling expansion valve 14b, the inside evaporator 18, the evaporation pressure regulating valve 20, the chiller expansion valve 14c, and the chiller 19.

The chiller expansion valve 14c and the chiller 19 are disposed in parallel with the air-cooling expansion valve 14b, the inside evaporator 18, and the evaporation pressure regulating valve 20 in a refrigerant flow.

The refrigeration cycle device 10 according to the present embodiment includes a first refrigerant circulation circuit and a second refrigerant circulation circuit. In the first refrigerant circulation circuit, the refrigerant circulates in the order of the compressor 11, the water-refrigerant heat exchanger 12, the air-cooling expansion valve 14b, the inside evaporator 18, the evaporation pressure regulating valve 20, and the compressor 11. In the second refrigerant circulation circuit, the refrigerant circulates in the order of the compressor 11, water-refrigerant heat exchanger 12, the chiller expansion valve 14c, and chiller 19.

The water-refrigerant heat exchanger 12 includes a condensing portion 12a, a receiver 12b, and a subcooling portion 12c. The condensing portion 12a exchanges heat between the high-pressure-side refrigerant discharged from the compressor 11 and the cooling water in the high-temperature-side heat medium circuit 40 to condense the high-pressure-side refrigerant.

The receiver 12b is a gas-liquid separation unit that separates the high-pressure refrigerant flowing out of the condensing portion 12a into gas and liquid, causes the separated liquid-phase refrigerant to flow to the downstream side, and stores an excess refrigerant in the cycle.

The subcooling portion 12c exchanges heat between the liquid-phase refrigerant flowing out of the receiver 12b and the cooling water in the high-temperature-side heat medium circuit 40 to subcool the liquid-phase refrigerant.

In the high-temperature-side heat medium circuit 40, the water-refrigerant heat exchanger 12, the high-temperature-side heat medium pump 41, the heater core 42, a high-temperature-side radiator 44, a high-temperature side reserve tank 45, a heater core flow path on-off valve 46, and a radiator flow path on-off valve 47 are disposed.

The high-temperature-side heat medium pump 41 is a heat medium pump that sucks and discharges cooling water. The high-temperature-side heat medium pump 41 is an electric pump. The high-temperature-side heat medium pump 41 is an electric pump with a constant discharge flow rate, but the high-temperature-side heat medium pump 41 may be an electric pump with a variable discharge flow rate.

The heater core 42 is an air heater that exchanges heat between the cooling water in the high-temperature-side heat medium circuit 40 and air supplied to the vehicle cabin to heat the air supplied to the vehicle cabin. In the heater core 42, the cooling water radiates heat to the air supplied to the vehicle cabin.

The water-refrigerant heat exchanger 12 and the heater core 42 are air heating units that cause the high-pressure refrigerant discharged from the compressor 11 to radiate heat for the purpose of heating the air supplied to the vehicle cabin.

The high-temperature-side radiator 44 is a radiator that exchanges heat between the cooling water in the high-temperature-side heat medium circuit 40 and outside air to radiate heat from the cooling water to the outside air.

The high-temperature-side reserve tank 45 is a cooling water storage unit that stores excess cooling water. By storing the excess cooling water in the high-temperature-side reserve tank 45, it is possible to suppress a decrease in the amount of the cooling water circulating through each flow path.

The high-temperature-side reserve tank 45 is a sealed reserve tank or an open-to-atmosphere reserve tank. The sealed reserve tank is a reserve tank that brings the pressure at the liquid level of the stored cooling water to a predetermined pressure. The open-to-atmosphere reserve tank is a reserve tank that brings the pressure at the liquid level of the stored cooling water to the atmospheric pressure.

The water-refrigerant heat exchanger 12, the high-temperature-side heat medium pump 41, and the high-temperature-side reserve tank 45 are disposed in a condenser flow path 40a. The condenser flow path 40a is a flow path through which the cooling water in the high-temperature-side heat medium circuit 40 flows.

The heater core 42 and the heater core flow path on-off valve 46 are disposed in a heater core flow path 40b. The heater core flow path 40b is a flow path through which the cooling water in the high-temperature-side heat medium circuit 40 flows. The heater core flow path on-off valve 46 is an electromagnetic valve that opens and closes the heater core flow path 40b. The operation of the heater core flow path on-off valve 46 is controlled by the cycle control device 60.

The high-temperature side-radiator 44 and the radiator flow path on-off valve 47 are disposed in a radiator flow path 40c. The radiator flow path 40c is a flow path through which the cooling water in the high-temperature-side heat medium circuit 40 flows in parallel with the heater core 42. The radiator flow path on-off valve 47 is an electromagnetic valve that opens and closes the radiator flow path 40c. The operation of the radiator flow path on-off valve 47 is controlled by the cycle control device 60.

The heater core flow path on-off valve 46 is disposed between the heater core 42 and a high-temperature-side branch portion 40d that is a branch portion between the heater core flow path 40b and the radiator flow path 40c, in the high-temperature-side heat medium circuit 40. The heater core flow path on-off valve 46 regulates the flow rate of the cooling water in the high-temperature-side heat medium circuit 40 flowing into the heater core 42.

The radiator flow path on-off valve 47 is disposed between the high-temperature-side branch portion 40d and the high-temperature-side radiator 44 in the high-temperature-side heat medium circuit 40. The radiator flow path on-off valve 47 regulates the flow rate of the cooling water in the high-temperature-side heat medium circuit 40 flowing into the high-temperature-side radiator 44.

The heater core flow path on-off valve 46 and the radiator flow path on-off valve 47 are high-temperature heat medium regulating units that regulate a flow rate ratio between the cooling water flowing through the heater core 42 and the cooling water flowing through the high-temperature-side radiator 44. The flow rate ratio between the cooling water flowing through the heater core 42 and the cooling water flowing through the high-temperature side radiator 44 is a high-temperature heat medium flow rate ratio. The radiator flow path on-off valve 47 is a radiator-side regulating unit. The heater core flow path on-off valve 46 is an air-heater-side regulating unit. The heater core flow path on-off valve 46 and the radiator flow path on-off valve 47 are flow rate regulating mechanisms that regulate the flow rate of the cooling water (in other words, the flow rate regulating mechanisms).

In the low-temperature-side heat medium circuit 50, the low-temperature-side heat medium pump 51, the chiller 19, the cooling heat exchange unit 52, the low-temperature-side radiator 54, the cooling target equipment 56, and a low-temperature-side reserve tank 57 are disposed.

The high-temperature-side radiator 44 and the low-temperature-side radiator 54 are arranged in series in this order in a flow direction of outside air.

The high-temperature-side radiator 44 and the low-temperature-side radiator 54 are disposed at the foremost of the vehicle. Therefore, during traveling of the vehicle, traveling air can be applied to the high-temperature-side radiator 44 and the low-temperature-side radiator 54.

The low-temperature-side reserve tank 57 is a cooling water storage unit that stores excess cooling water. By storing excess cooling water in the low-temperature-side reserve tank 57, it is possible to suppress a decrease in the amount of cooling water circulating through each flow path. The low-temperature-side reserve tank 57 is a sealed reserve tank or an open-to-atmosphere reserve tank.

A three-way valve 53 is disposed in the low-temperature-side heat medium circuit 50. The three-way valve 53 is a low-temperature heat medium regulating unit that regulates the flow rate ratio between the flow rate of cooling water flowing to the side of the cooling heat exchange unit 52 and the flow rate of cooling water flowing to the side of the low-temperature-side radiator 54.

The three-way valve 53 is a heat medium flow switching unit that switches between a state where cooling water flows to the low-temperature-side radiator 54 and a state where cooling water does not flow to the low-temperature-side radiator 54. The operation of the three-way valve 53 is controlled by the cycle control device 60.

The operation of the present embodiment will be described. In the refrigeration cycle device 10 of the present embodiment, the air-cooling operation, the air-heating operation, and the dehumidifying and air-heating operation can be performed by switching the refrigerant circuit, the high-temperature-side heat medium circuit 40, and the low-temperature-side heat medium circuit 50.

In at least an operation mode in which the refrigerant flows to the chiller 19 and the heater core 42 performs air-heating, in a case where the amount of heat absorbed by the chiller 19 is larger than the amount of waste heat of the battery 80 and the cooling target equipment 56, the flow rate of cooling water flowing through the battery 80 and the cooling target equipment 56 is regulated by the three-way valve 53 to control the amount of heat absorbed, and at that time, the shutter 90 is opened.

In a case where the amount of waste heat of the battery 80 and the cooling target equipment 56 is larger than the amount of heat absorbed by the chiller 19, heat is not absorbed from outside air by the low-temperature-side radiator 54, and the waste heat of the battery 80 and the cooling target equipment 56 is absorbed by the chiller 19. At that time, since the shutter 90 is closed and the air resistance of the vehicle can be reduced, energy saving of the vehicle can be achieved.

The present disclosure is not limited to the embodiments described above, and can be variously modified as follows without departing from the gist of the present disclosure. The means disclosed in the individual embodiments may be appropriately combined within a feasible range.

For example, an inside condenser may be used as the heating unit of the refrigeration cycle device 10. The inside condenser is a heat exchanger that exchanges heat between the high-temperature and high-pressure refrigerant discharged from the compressor 11 and air to condense the refrigerant and heat the air. The inside condenser is a heat exchanger disposed in the air conditioning casing 31 of the inside air conditioning unit 30 similarly to the heater core 42 described in the first embodiment.

Although the opening and closing of the shutter 90 is determined for each operation mode in the air-heating operation, the opening and closing of the shutter 90 may also be determined for each operation mode in the dehumidifying and air-heating operation.

The above embodiments have described the refrigeration cycle device 10 capable of switching to a plurality of operation modes, but switching between the operation modes in the refrigeration cycle device 10 is not limited thereto. It is only required that at least the air-heating operation or the dehumidifying and air-heating operation can be performed. The detailed control of each operation mode is not limited to those disclosed in the embodiments described above.

The components of the refrigeration cycle device are not limited to those disclosed in the embodiments described above. A plurality of cycle components may be integrated in such a manner that the effects described above can be exhibited. For example, a four-way joint structure in which the second three-way joint 13b and the fifth three-way joint 13e are integrated may be used. Furthermore, as the air-cooling expansion valve 14b and the chiller expansion valve 14c, a device in which an electric expansion valve that does not have a full-close function and an on-off valve are directly connected may be used.

The embodiments have described the example of using R1234yf as a refrigerant, but the present disclosure is not limited thereto. For example, R134a, R600a, R410A, R404A, R32, R407C, and the like may be used. Alternatively, a mixed refrigerant obtained by mixing a plurality of types of these refrigerants or the like may be used. Furthermore, carbon dioxide may be used as a refrigerant, and a supercritical refrigeration cycle in which the high-pressure-side refrigerant pressure is equal to or higher than the critical pressure of the refrigerant may be configured.

The configuration of the heating unit is not limited to those disclosed in the embodiments described above. For example, a three-way valve and a high-temperature-side radiator that are respectively similar to the first three-way valve 53a and the low-temperature-side radiator 54 in the low-temperature-side heat medium circuit 50 may be added to the high-temperature-side heat medium circuit 40 described in the first embodiment, and excessive heat may be radiated to outside air. Furthermore, in a vehicle including an internal combustion engine (an engine) such as a hybrid vehicle, engine cooling water may be circulated through the high-temperature-side heat medium circuit 40.

The configuration of the battery cooling unit is not limited to those disclosed in the embodiments described above. For example, as the battery cooling unit, a thermosiphon may be used in which the chiller 19 of the low-temperature-side heat medium circuit 50 described in the first embodiment serves as a condensing portion and the cooling heat exchange unit 52 serves as an evaporating portion. Accordingly, the first low-temperature-side heat medium pump 51 can be eliminated.

The thermosiphon includes an evaporating portion that evaporates a refrigerant and a condensing portion that condenses the refrigerant, and is configured by connecting the evaporating portion and the condensing portion in a closed loop shape (that is, in an annular shape). The thermosiphon is a heat transport circuit that generates a specific gravity difference in the refrigerant in the circuit by a temperature difference between the temperature of the refrigerant in the evaporating portion and the temperature of the refrigerant in the condensing portion, and naturally circulates the refrigerant by the action of gravity to transport heat together with the refrigerant.

In the above embodiments, the inverter, the motor generator, and the ADAS control device are described as an example of the cooling target equipment 56, but the cooling target equipment 56 is not limited thereto. For example, the cooling target equipment 56 may be an electric device that generates heat during operation like a charger that charges battery 80 with electric power.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

What is claimed is:

1. A refrigeration cycle device comprising:
    a compressor configured to suck, compress, and discharge a refrigerant;
    a heat radiating unit configured to cause the refrigerant discharged from the compressor to radiate heat to heat air supplied to a space inside a vehicle cabin;
    a decompression unit configured to decompress the refrigerant having radiated heat in the heat radiating unit;
    an outside air heat absorbing unit configured to cause the refrigerant decompressed by the decompression unit to absorb heat from outside air;
    a waste heat absorbing unit configured to cause the refrigerant decompressed by the decompression unit to absorb waste heat of a waste heat device;
    a shutter configured to open and close to regulate an opening of a passage for the outside air introduced into the outside air heat absorbing unit; and
    a controller configured to close the shutter when the controller determines that an amount of waste heat of the waste heat device is larger than an amount of heat absorbed by the refrigerant in the outside air heat absorbing unit and the waste heat absorbing unit.

2. The refrigeration cycle device according to claim 1, wherein the controller closes the shutter when a flow of the refrigerant to the outside air heat absorbing unit is blocked.

3. The refrigeration cycle device according to claim 1, wherein
    the controller determines whether the outside air heat absorbing unit absorbs heat on a basis of a temperature of the refrigerant in the outside air heat absorbing unit and an outside air temperature,
    in a case where the controller determines that the outside air heat absorbing unit absorbs heat, the controller determines whether an amount of waste heat of the waste heat device is larger than an amount of heat absorbed by the refrigerant in the outside air heat absorbing unit and the waste heat absorbing unit, and
    when the controller determines that the amount of waste heat of the waste heat device is larger than the amount of heat absorbed by the refrigerant in the outside air heat absorbing unit and the waste heat absorbing unit, the controller closes the shutter.

4. The refrigeration cycle device according to claim 1, wherein
    the waste heat absorbing unit causes the refrigerant to absorb heat from a heat medium that cools the waste heat device,
    the refrigeration cycle device further comprises a radiator that exchanges heat between the heat medium and the outside air,
    the shutter opens and closes a passage for the outside air introduced into the radiator, and
    the controller opens the shutter when a temperature of the heat medium is equal to or higher than a forced cooling temperature.

5. The refrigeration cycle device according to claim 1, wherein
    a waste heat recovery mode in which the waste heat absorbing unit absorbs waste heat of the waste heat device and an outside air heat absorbing mode in which the outside air heat absorbing unit absorbs heat from the outside air can be switched from each other, the waste heat absorbing unit causes the refrigerant to absorb heat from a heat medium that cools the waste heat device, and in a case where a temperature of the heat medium is equal to or higher than a waste heat recovery temperature, the controller shifts to the waste heat recovery mode, and the controller closes the shutter when the controller determines that an amount of waste heat of the waste heat device is larger than an amount of heat absorbed by the refrigerant in the outside air heat absorbing unit and the waste heat absorbing unit in the waste heat recovery mode.

6. The refrigeration cycle device according to claim 1, wherein the waste heat device has a characteristic that an amount of waste heat increases as a travel load of a vehicle increases, and the controller closes the shutter when the travel load exceeds a predetermined load.

7. A refrigeration cycle device comprising:

a compressor configured to suck, compress, and discharge a refrigerant;

a heater core configured to cause the refrigerant discharged from the compressor to radiate heat to heat air supplied to a space inside a vehicle cabin;

an air-heating expansion valve configured to decompress the refrigerant having radiated heat in the heater core;

an outside heat exchanger configured to cause the refrigerant decompressed by the air-heating expansion valve to absorb heat from outside air;

a chiller configured to cause the refrigerant decompressed by the air-heating expansion valve to absorb waste heat of a battery;

a shutter configured to open and close to regulate an opening of a passage for the outside air introduced into the outside heat exchanger; and a controller configured to close the shutter when the controller determines that an amount of waste heat of the battery is larger than an amount of heat absorbed by the refrigerant in the outside heat exchanger and the chiller.

8. The refrigeration cycle device according to claim 7, wherein the controller closes the shutter when a flow of the refrigerant to the outside heat exchanger is blocked.

9. The refrigeration cycle device according to claim 7, wherein the controller determines whether the outside heat exchanger absorbs heat on a basis of a temperature of the refrigerant in the outside heat exchanger and an outside air temperature, in a case where the controller determines that the outside heat exchanger absorbs heat, the controller determines whether an amount of waste heat of the battery is larger than an amount of heat absorbed by the refrigerant in the outside heat exchanger and the chiller, and when the controller determines that the amount of waste heat of the battery is larger than the amount of heat absorbed by the refrigerant in the outside heat exchanger and the chiller, the controller closes the shutter.

10. The refrigeration cycle device according to claim 7, wherein the chiller causes the refrigerant to absorb heat from a heat medium that cools the battery, the refrigeration cycle device further comprises a radiator that exchanges heat between the heat medium and the outside air, the shutter opens and closes a passage for the outside air introduced into the radiator, and the controller opens the shutter when a temperature of the heat medium is equal to or higher than a forced cooling temperature.

11. The refrigeration cycle device according to claim 7, wherein a waste heat recovery mode in which the chiller absorbs waste heat of the battery and an outside air heat absorbing mode in which the outside heat exchanger absorbs heat from the outside air can be switched from each other, the chiller causes the refrigerant to absorb heat from a heat medium that cools the battery, and in a case where a temperature of the heat medium is equal to or higher than a waste heat recovery temperature, the controller shifts to the waste heat recovery mode, and the controller closes the shutter when the controller determines that an amount of waste heat of the battery is larger than an amount of heat absorbed by the refrigerant in the outside heat exchanger and the chiller in the waste heat recovery mode.

12. The refrigeration cycle device according to claim 7, wherein the battery has a characteristic that an amount of waste heat increases as a travel load of a vehicle increases, and the controller closes the shutter when the travel load exceeds a predetermined load.

* * * * *